US011864203B2

(12) United States Patent
Basu Mallick et al.

(10) Patent No.: US 11,864,203 B2
(45) Date of Patent: *Jan. 2, 2024

(54) RESOURCE ALLOCATION FOR DEVICE TO DEVICE (D2D) COMMUNICATION

(71) Applicant: Sun Patent Trust, New York, NY (US)

(72) Inventors: Prateek Basu Mallick, Hessen (DE); Joachim Loehr, Hessen (DE); Lilei Wang, Beijing (CN); Sujuan Feng, Frankfurt (DE)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,915

(22) Filed: Nov. 1, 2022

(65) Prior Publication Data

US 2023/0063272 A1  Mar. 2, 2023

Related U.S. Application Data

(63) Continuation of application No. 17/017,303, filed on Sep. 10, 2020, now Pat. No. 11,528,698, which is a
(Continued)

(51) Int. Cl.
H04W 72/04 (2023.01)
H04W 72/23 (2023.01)
(Continued)

(52) U.S. Cl.
CPC .......... *H04W 72/23* (2023.01); *H04W 48/06* (2013.01); *H04W 48/10* (2013.01); *H04W 72/02* (2013.01);
(Continued)

(58) Field of Classification Search
CPC ... H04W 72/042; H04W 48/06; H04W 48/10; H04W 72/02; H04W 72/04; H04W 72/0446; H04W 76/14
See application file for complete search history.

(56) References Cited

U.S. PATENT DOCUMENTS

| 8,254,945 | B2 | 8/2012 | Lee et al. |
| 9,894,699 | B2 | 2/2018 | Lei et al. |
| 10,149,338 | B2 * | 12/2018 | Basu Mallick ... H04W 72/0446 |
| 10,805,915 | B2 | 10/2020 | Basu Mallick et al. |
| 2006/0264218 | A1 | 11/2006 | Zhang et al. |
| 2010/0240312 | A1 | 9/2010 | Peng et al. |
| 2010/0304759 | A1 | 12/2010 | Leppanen et al. |

(Continued)

FOREIGN PATENT DOCUMENTS

| CN | 102771174 A | 11/2012 |
| CN | 103428847 A | 12/2013 |

(Continued)

OTHER PUBLICATIONS

3GPP TR 36.843 V12.0.0, "3rd Generation Partnership Project; Technical Specification Group Radio Access Network; Study on LTE device to device proximity services; Radio aspects (Release 12)," Mar. 2014, 49 pages.

(Continued)

*Primary Examiner* — Minh Trang T Nguyen
(74) *Attorney, Agent, or Firm* — Seed IP Law Group LLP

(57) ABSTRACT

The invention relates to a method for allocating radio resources to a transmitting terminal for performing direct communication transmission over a direct link connection. The transmitting terminal receives a system information broadcast from the base station, which comprises information on a temporary transmission radio resource pool, indicating radio resources for performing a direct communication transmission, and comprises configuration information on the resource pool to limit the amount of time that the temporary radio resource pool is usable by the transmitting terminal.

9 Claims, 14 Drawing Sheets

Related U.S. Application Data continuation of application No. 16/161,754, filed on Oct. 16, 2018, now Pat. No. 10,805,915, which is a continuation of application No. 15/512,828, filed as application No. PCT/CN2014/087567 on Sep. 26, 2014, now Pat. No. 10,149,338.

(51) Int. Cl.

| | | |
|---|---|---|
| *H04W 76/14* | (2018.01) | |
| *H04W 72/12* | (2023.01) | |
| *H04W 48/06* | (2009.01) | |
| *H04W 48/10* | (2009.01) | |
| *H04W 72/02* | (2009.01) | |
| *H04W 72/0446* | (2023.01) | |

(52) U.S. Cl.
CPC ....... *H04W 72/04* (2013.01); *H04W 72/0446* (2013.01); *H04W 72/12* (2013.01); *H04W 76/14* (2018.02)

(56) References Cited

U.S. PATENT DOCUMENTS

| | | |
|---|---|---|
| 2011/0098043 A1 | 4/2011 | Yu et al. |
| 2011/0106952 A1 | 5/2011 | Doppler et al. |
| 2011/0164587 A1 | 7/2011 | Seo |
| 2011/0274040 A1 | 11/2011 | Pani et al. |
| 2013/0028227 A1 | 1/2013 | Kim et al. |
| 2013/0083753 A1 | 4/2013 | Lee et al. |
| 2013/0148637 A1 | 6/2013 | Yang et al. |
| 2013/0178221 A1 | 7/2013 | Jung et al. |
| 2013/0294337 A1 | 11/2013 | Damnjanovic et al. |
| 2013/0322413 A1 | 12/2013 | Pelletier et al. |
| 2014/0094183 A1 | 4/2014 | Gao et al. |
| 2015/0009910 A1 | 1/2015 | Ryu et al. |
| 2015/0124748 A1 | 5/2015 | Park et al. |
| 2015/0271861 A1 | 9/2015 | Li et al. |
| 2016/0044737 A1 | 2/2016 | Kwon |
| 2016/0212793 A1 | 7/2016 | Jung et al. |
| 2016/0219640 A1 | 7/2016 | Jung et al. |
| 2017/0006585 A1 | 1/2017 | Jung et al. |
| 2017/0026937 A1 | 1/2017 | Jung et al. |
| 2017/0118621 A1 | 4/2017 | Sorrentino |
| 2017/0188408 A1 | 6/2017 | Jung et al. |
| 2017/0230938 A1 | 8/2017 | Huang et al. |
| 2019/0059094 A1 | 2/2019 | Kaur et al. |

FOREIGN PATENT DOCUMENTS

| | | |
|---|---|---|
| CN | 103841649 A | 6/2014 |
| CN | 103974288 A | 8/2014 |
| EP | 1742427 A2 | 1/2007 |
| EP | 2943033 A1 | 11/2015 |
| EP | 3151621 A1 | 4/2017 |
| JP | 2017527182 A | 9/2017 |
| RU | 2011142449 A | 4/2013 |
| RU | 2503153 C2 | 12/2013 |
| RU | 2515547 C2 | 5/2014 |
| TW | 201330558 A | 7/2013 |
| WO | WO 2009138820 A1 | 11/2009 |
| WO | WO 2015143170 A1 | 9/2015 |
| WO | WO 2015163714 A1 | 10/2015 |
| WO | WO 2015170944 A1 | 11/2015 |
| WO | WO 2015182982 A1 | 12/2015 |
| WO | WO 2016019691 A1 | 2/2016 |

OTHER PUBLICATIONS

3GPP TR 36.843 V12.0.1, "3rd Generation Partnership Project; Technical Specification Group Radio Access Network; Study on LTE Device to Device Proximity Services; Radio aspects (Release 12)," Mar. 2014, 50 pages.

3GPP TS 23.303 V12.1.0, "3rd Generation Partnership Project; Technical Specification Group Services and System Aspects; Proximity-based services (ProSe); Stage 2 (Release 12)," Jun. 2014, 60 pages.
3GPP TS 25.331 V12.2.0, "3rd Generation Partnership Project; Technical Specification Group Radio Access Network; Radio Resource Control (RRC); Protocol specification (Release 12)," Jun. 2014, 2140 pages.
3GPP TS 36.211 V12.2.0, "3rd Generation Partnership Project; Technical Specification Group Radio Access Network; Evolved Universal Terrestrial Radio Access (E-UTRA); Physical channels and modulation," Jun. 2014, 121 pages.
3GPP TS 36.300 V12.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Jun. 2014, 215 pages.
3GPP TS 36.304 V12.1.0, "3rd Generation Partnership Project; Technical Specification Group Radio Access Network; Evolved Universal Terrestrial Radio Access (E-UTRA); User Equipment (UE) procedures in idle mode (Release 12)," Jun. 2014, 35 pages.
3GPP TS 36.321 V12.2.1, "3rd Generation Partnership Project; Technical Specification Group Radio Access Network; Evolved Universal Terrestrial Radio Access (E-UTRA); Medium Access Control (MAC) protocol specification (Release 12)," Jun. 2014, 57 pages.
3GPP TS 36.331 V12.2.0, "3rd Generation Partnership Project; Technical Specification Group Radio Access Network; Evolved Universal Terrestrial Radio Access (E-UTRA); Radio Resource Control (RRC); Protocol specification (Release 12)," Jun. 2014, 365 pages.
Australian Examination Report No. 1, dated Mar. 22, 2019, for corresponding Australian Application No. 2014406893, 7 pages.
Australian Examination Report, dated Feb. 4, 2021, for Australian Application No. 2020202937, 8 pages.
CATT, "D2D discovery during mobility and RLF," R2-144341, Agenda Item: 7.3.3.1, 3GPP TSG RAN WG2 Meeting #87bis, Shanghai, China, Oct. 6-10, 2014, 4 pages.
CATT, "Open Issues for D2D Communication," R2-143388, Agenda Item: 7.4.2.1, 3GPP TSG RAN WG2 Meeting #87, Dresden, Germany, Aug. 18-22, 2014, 4 pages.
Extended European Search Report, dated Mar. 29, 2018, for European Application No. 14902654.4-1231 / 3198981, 11 pages.
Fujitsu, "Further considerations on the mode configuration and exceptional cases," R2-143145, Agenda item: 7.4.2.1, 3GPP TSG-RAN WG2 Meeting#87, Dresden, Germany, Aug. 18-22, 2014, 6 pages.
Indian Examination Report dated Jun. 18, 2020 for the corresponding Indian Patent Application No. 201747009025, 5 pages.
Indian Office Action, dated Feb. 7, 2022, for Indian Application No. 202048055160, 5 pages.
Intel Corporation, "Remaining issues on exceptional cases using Mode 2," R2-143237, Agenda Item: 7.4.2.1, 3GPP TSG-RAN WG2 #87, Dresden, Germany, Aug. 18-22, 2014, 2 pages.
Intel Corporation, "Resource Allocation for Mode-1 D2D Operation," R1-142872, Agenda item: 7.2.3.2.2, 3GPP TSG RAN WG1 Meeting #78, Dresden, Germany, Aug. 18-24, 2014, 7 pages.
Intel Corporation, "Resource Allocation for Mode-2 D2D Operation," R1-142871, Agenda item: 7.2.3.2.1, 3GPP TSG RAN WG1 Meeting #78, Dresden, Germany, Aug. 18-24, 2014, 10 pages.
International Search Report dated Jul. 1, 2015, for corresponding International Application No. PCT/CN2014/087567, 2 pages.
Korean Office Action, dated Jul. 12, 2021, for Korean Application No. 2021-7012991, 9 pages.
LISTSERV 16.5, 3GPP_TSG_RAN_WG2 Archives, "Re: [87#30][LTE/ProSe] Exceptional cases and exit conditions (Samsung)," R2-14xxxx Email Discussion, dated Sep. 20, 2014, downloaded on Jan. 8, 2020, from https://list.etsi.org/scripts/wa.exe?A2-ind1409C&L=3GPP_TSG_RAN_WG2&O=D&P=102419, 13 pages.
Notice of Reasons for Rejection, dated Jul. 24, 2018, for Japanese Application No. 2017-515153, 19 pages (with English translation).
Notice of Reasons for Rejection, dated Nov. 13, 2018, for the related Japanese Patent Application No. 2017-515153, 6 pages.

(56) References Cited

OTHER PUBLICATIONS

Panasonic, "D2D Communication Continuity in all Network Deployment," R2-144383, 3GPP TSG-RAN WG2 Meeting #87bis, Agenda Item: 7.3.2.1.3 Resource Allocation, Oct. 6-10, 2014, Shanghai, China, 5 pages.
Patil, "Status Report to TSG," RP-141637, Agenda item: 11.7.11, 3GPP TSG RAN meeting #65, Edinburg, Great Britain, Sep. 9-12, 2014, 18 pages.
Qualcomm Incorporated et al., "Introduction of ProSe," R2-142750, 3GPP TSG-RAN WG2 #86, Seoul, South Korea, May 19-23, 2014, 12 pages.
Qualcomm Incorporation, Samsung, R2, "Introduction of ProSe," R2-143672, 3GPP TSG-RAN WG2 #87, Dresden, Germany, Aug. 18-22, 2014, 20 pages.
Russian Office Action and Search Report, dated Sep. 9, 2019, for Russian Application No. 2019105125/08(009843), 10 pages. (with English translation).
Samsung, "Discovery Resource Configuration Parameters in SIB," R2-144308, Agenda Item: 7.3.3.1, 3GPP TSG RAN WG2 Meeting #87bis, Shanghai, China, Oct. 6-10, 2014, 4 pages.
Samsung, "Further details regarding "exception conditions"," R2-143083, Agenda Item: 7.4.2.1, 3GPP TSG-RAN WG2 Meeting #87, Dresden, Germany, Aug. 18-22, 2014, 4 pages.
Samsung, "ProSe Communication: High level aspects resource configuration," Tdoc R2-144487, Agenda Item: 7.3.2.1.4, 3GPP TSG-RAN2#87 bis meeting, Shanghai, P.R. China, Oct. 6-10, 2014, 4 pages.
Samsung, "Report on [87#30][LTE/ProSe] exceptional cases and exit conditions," R2-14xxxx, Agenda Item: 7.3.2.1.3, 3GPP TSG-RAN WG2 #87bis, Shanghai, China, Oct. 6-10, 2014, 20 pages.
Samsung, R2, "Introduction of ProSe," R2-143565, 3GPP TSG-RAN2 Meeting #87, Dresden, Germany, Aug. 18-22, 2014, 17 pages.
Sharp, "D2D Grant Design for T-RPT," R1-143209, Agenda Item: 7.2.3.2.2, 3GPP TSG RAN WG1 Meeting #78, Dresden, Germany, Aug. 18-22, 2014, 4 pages.
Sharp, "Further Aspects about D2D Communication Resource Pool Configurations," R2-143652, Agenda Item: 7.4.2.1, 3GPP TSG RAN2 WG2 Meeting #87, Dresden, Germany, Aug. 18-22, 2014, 3 pages.
Sony, "D2D Resource Allocation Mode Selection and exceptional cases," R2-143152, Agenda item: 7.4.2.1, 3GPP TSG-RAN WG2 Meeting #87, Dresden, Germany, Aug. 18-22, 2014, 5 pages.
Zte, "Exceptional conditions for Mode 2," R2-143597, 3GPP TSG-RAN WG2 Meeting #87, Dresden, Germany, Aug. 18-22, 2014, 4 pages.
English Translation of Chinese Office Action, dated Aug. 17, 2023, for Chinese Patent Application No. 202110002020.2. (6 pages).

* cited by examiner

State 1: UL coverage
State 2: DL coverage
State 3: CP UE-Relay coverage
State 4: out of coverage

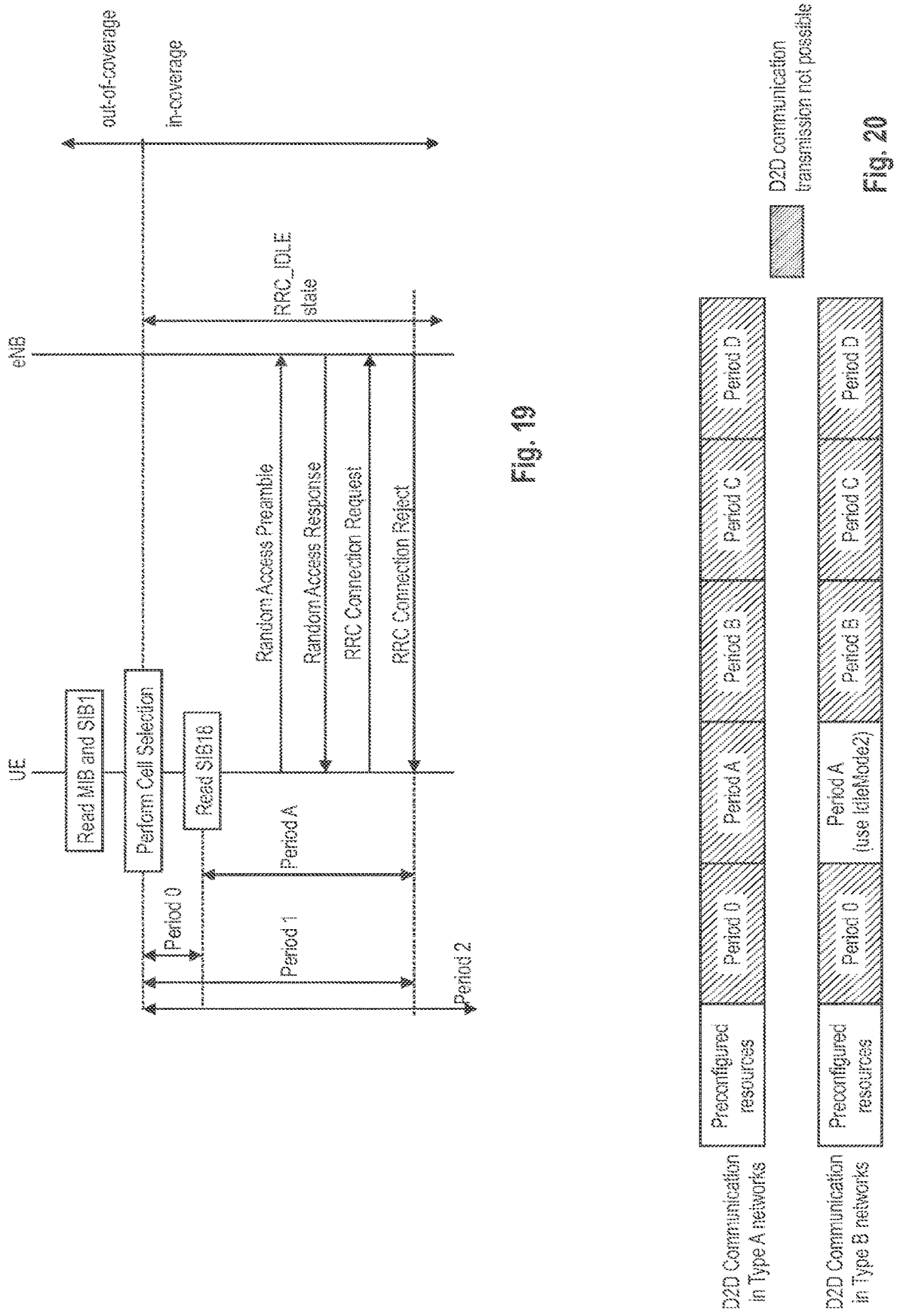

RESOURCE ALLOCATION FOR DEVICE TO DEVICE (D2D) COMMUNICATION

BACKGROUND

Technical Field

The present disclosure relates to methods for allocating radio resources to a transmitting terminal for performing a direct communication transmission over a direct link connection with a receiving terminal. The present disclosure is also providing the transmitting terminal and base station for participating in the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g., 7 OFDM symbols) and $N_{sc}^{RB}$ consecutive subcarriers in the frequency domain as exemplified in FIG. 4 (e.g., 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Carrier Aggregation in LTE-A for support of wider bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g., barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not to provide the same coverage.

The spacing between centre frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC).

The configuration and reconfiguration, as well addition and removal, as of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation there is one pair of uplink and downlink component carriers that is always active. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

LTE RRC States

LTE is based on only two main states: "RRC_IDLE" and "RRC_CONNECTED".

In RRC_IDLE the radio is not active, but an ID is assigned and tracked by the network. More specifically, a mobile terminal in RRC_IDLE performs cell selection and reselection—in other words, it decides on which cell to camp. The cell (re)selection process takes into account the priority of each applicable frequency of each applicable Radio Access Technology (RAT), the radio link quality and the cell status (i.e., whether a cell is barred or reserved). An RRC_IDLE mobile terminal monitors a paging channel to detect incoming calls, and also acquires system information. The system information mainly consists of parameters by which the network (E-UTRAN) can control the cell (re) selection process and also how the mobile terminal accesses the network. RRC specifies the control signalling applicable for a mobile terminal in RRC_IDLE, namely paging and system information. The mobile terminal behaviour in RRC_IDLE is specified in more detail, e.g., in TS 36.304, chapter 4 "General description of Idle mode" incorporated herein by reference.

In RRC_CONNECTED the mobile terminal has an active radio operation with contexts in the eNodeB. The E-UTRAN allocates radio resources to the mobile terminal to facilitate the transfer of (unicast) data via shared data channels. To support this operation, the mobile terminal monitors an associated control channel which is used to indicate the dynamic allocation of the shared transmission resources in time and frequency. The mobile terminal provides the network with reports of its buffer status and of the downlink channel quality, as well as neighbouring cell measurement information to enable E-UTRAN to select the most appropriate cell for the mobile terminal. These measurement reports include cells using other frequencies or RATs. The UE also receives system information, consisting mainly of information required to use the transmission channels. To extend its battery lifetime, a UE in RRC_CONNECTED may be configured with a Discontinuous Reception (DRX) cycle. RRC is the protocol by which the E-UTRAN controls the UE behaviour in RRC_CONNECTED.

The various functions of the mobile terminal in RRC Protocol for and including Connected Mode are described in 3GPP TS36.331 in Ch. 4 "Functions", incorporated herein by reference.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and assumed improved coverage (higher data rates for a given terminal peak power). During each time interval, Node B assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size $BW_{grant}$ during one time interval, e.g., a sub-frame of 0.5 ms, onto which coded information bits are mapped. It should be noted that a sub-frame, also referred to as transmission time interval (TTI), is the smallest time interval for user data transmission. It is however possible to assign a frequency resource $BW_{grant}$ over a longer time period than one TTI to a user by concatenation of sub-frames.

UL Scheduling Scheme for LTE

The uplink scheme allows for both scheduled access, i.e., controlled by eNB, and contention-based access.

In case of scheduled access, the UE is allocated a certain frequency resource for a certain time (i.e., a time/frequency resource) for uplink data transmission. However, some time/frequency resources can be allocated for contention-based access. Within these time/frequency resources, UEs can transmit without first being scheduled. One scenario where UE is making a contention-based access is for example the random access, i.e., when UE is performing initial access to a cell or for requesting uplink resources.

For the scheduled access Node B scheduler assigns a user a unique frequency/time resource for uplink data transmission. More specifically the scheduler determines which UE(s) is (are) allowed to transmit, which physical channel resources (frequency), Transport format (Modulation Coding Scheme (MCS)) to be used by the mobile terminal for transmission The allocation information is signaled to the UE via a scheduling grant, sent on the L1/L2 control channel. For simplicity reasons this channel is called uplink grant channel in the following. A scheduling grant message contains at least information which part of the frequency band the UE is allowed to use, the validity period of the grant, and the transport format the UE has to use for the upcoming uplink transmission. The shortest validity period is one sub-frame. Additional information may also be included in the grant message, depending on the selected scheme. Only "per UE"

grants are used to grant the right to transmit on the UL-SCH (i.e., there are no "per UE per RB" grants). Therefore the UE needs to distribute the allocated resources among the radio bearers according to some rules. Unlike in HSUPA, there is no UE based transport format selection. The eNB decides the transport format based on some information, e.g., reported scheduling information and QoS info, and UE has to follow the selected transport format. In HSUPA the Node B assigns the maximum uplink resource, and UE selects accordingly the actual transport format for the data transmissions.

Since the scheduling of radio resources is the most important function in a shared channel access network for determining Quality of service, there are a number of requirements that should be fulfilled by the UL scheduling scheme for LTE in order to allow for an efficient QoS management.

Starvation of low priority services should be avoided

Clear QoS differentiation for radio bearers/services should be supported by the scheduling scheme The UL reporting should allow fine granular buffer reports (e.g., per radio bearer or per radio bearer group) in order to allow the eNB scheduler to identify for which Radio Bearer/service data is to be sent.

It should be possible to make clear QoS differentiation between services of different users It should be possible to provide a minimum bit rate per radio bearer As can be seen from above list one essential aspect of the LTE scheduling scheme is to provide mechanisms with which the operator can control the partitioning of its aggregated cell capacity between the radio bearers of the different QoS classes. The QoS class of a radio bearer is identified by the QoS profile of the corresponding SAE bearer signaled from AGW to eNB as described before. An operator can then allocate a certain amount of its aggregated cell capacity to the aggregated traffic associated with radio bearers of a certain QoS class. The main goal of employing this class-based approach is to be able to differentiate the treatment of packets depending on the QoS class they belong to.

(Broadcast) System Information Structure

In the 3GPP terminology, (broadcast) system information is also denoted BCCH information, i.e., it denotes the information carried on the Broadcast Control CHannel (being a logical channel) of the radio cell to which the UE is connected (active state) or attached (idle state).

Generally, system information includes a master information block (MIB) and several system information blocks (SIBs). MIB contains control information on each System Information Block. The control information associated to a respective SIB may have the following structure. Respective control information associated to a SIB may indicate the position of the SIB on a transport channel (e.g., position in the time-frequency plane for OFDM radio access, i.e., particular Resource Blocks being assigned for transmission of a respective SIB) on which it is transmitted relative to common timing reference. Further, a repetition period of SIB may be indicated. This repetition period indicates the periodicity at which the respective SIB is transmitted. The control information may also include a timer value for timer-based update mechanism or, alternatively, a value tag for a tag-based update of the SIB information.

The table below shows an overview of the categorization and types of system information blocks in a UMTS legacy system as defined in 3GPP TS 25.331, "Radio Resource Control (RRC)", version 12.2.0, section 8.1.1, incorporated herein by reference). System information is also defined for LTE systems, and details can be found in TS 36.331 V12.2.0 subclause 6.3.1, incorporated herein by reference.

As will be explained in much more detail in later sections, a Device-to-Device (D2D) communication technology is going to be implemented for LTE-Rel. 12. Among many other things, the 3GPP standardization is currently in the progress of defining the System InformationBlock Type 18 to contain some information related to ProSe Direct Communication and Discovery. The following definition of SIB18 is taken from the currently discussed change request R2-143565 for TS 36.331 capturing agreements so far regarding ProSe, which however is not yet finally decided and is thus to be seen as a mere example.

SystemInformationBlockType18 information element

```
-- ASN1START
SystemInformationBlockType18-r12 ::= SEQUENCE {
    commConfig-r12                         SEQUENCE {
    -- FFS if the Rx resource pool can be provided by system information
        commSA-RxResourcePoolCommon-r12                ProseCommSA-ResourcePool-r12 OPTIONAL, -- Need OR
        commIdleTxPool-r12                             SEQUENCE{
            commSA-TxResourcePoolCommon-r12                ProseCommSA-ResourcePool-r12,
            -- FFS whether to signal data Tx resources (needed if not always be inferrable from
            -- the SA Tx resources
            commData-TxResourcePoolCommon-r12              ProseCommDataResourcePool-r12 OPTIONAL -- Need OR
        }                                              OPTIONAL     -- Need OR
    },                                                 OPTIONAL,    -- Need OR
    discConfig-r12                         SEQUENCE {
        discRxResourcePool-r12                         ProseDiscResourcePool-r12,
        discIdleTxPool-r12                             ProseDiscResourcePool-r12            OPTIONAL -- Need OR
    }                                                  OPTIONAL,    -- Need OR
    discInterFreqList-r12                  CarrierFreqList-r12            OPTIONAL, -- Need OR
    lateNonCriticalExtension               OCTET STRING                   OPTIONAL,
    ...
}
CarrierFreqList-r12 ::= SEQUENCE (SIZE (1..maxFreq)) OF ARFCN-ValueEUTRA-r9
-- ASN1STOP
```

SystemInformationBlockType18 field descriptions commIdleTxPool
Indicates the resources by which the UE is allowed to perform direct communication transmissions while in RRC_IDLE.
discInterFreqList

| SystemInformationBlockType18 field descriptions |
| --- |
| Indicates the neighbouring frequencies on which direct discovery announcement is supported. |
| discIdleTxPool |
| Indicates the resources by which the UE is allowed to transmit direct discovery announcements while in RRC_IDLE. |

As apparent from the above system information, the field commIdleTxPool, including the sub-fields commSA-TxResourcePoolCommon indicates the common resources from which any of the UEs receiving the SIB18 and still being in idle can use (in a contention-based manner). In other words, the network operator can commonly define radio resources for all of the UEs, which are however only usable while the UE is still in idle. As will be introduced later, these radio resources defined by commIdleTxPool are categorized as Mode 2 resources, for being autonomously used by the UEs.

Buffer Status Reporting

The Buffer Status reporting procedure is used to provide the serving eNB with information about the amount of data available for transmission in the UL buffers of the UE. RRC controls BSR reporting by configuring the two timers periodicBSR-Timer and retxBSR-Timer and by, for each logical channel, optionally signalling logicalChannelGroup which allocates the logical channel to an LCG. Further information on buffer status reporting can be found in 3GPP TS 36.321 subclause 5.4.5, incorporated herein by reference.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market, and will, at the same time, serve the urgent needs of several Public Safety communities that are jointly committed to LTE.

Device-to-Device (D2D) communication is a technology component for LTE-Rel.12. The Device-to-Device (D2D) communication technology allows D2D as an underlay to the cellular network to increase the spectral efficiency. For example, if the cellular network is LTE, all data carrying physical channels use SC-FDMA for D2D signaling.

D2D Communication in LTE

The D2D communication in LTE is focusing on two areas: Discovery and Communication.

In D2D communication UEs transmit data signals to each other over a direct link using the cellular resources instead of through the base station (BS). D2D users communicate directly while remaining controlled under the BS, i.e., at least when being in coverage of an eNB. Therefore, D2D can improve system performances by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

With respect to the User plane protocols, in the following part of the agreement from D2D communication perspective is given (see also 3GPP TR 36.843 V12.0.0 section 9.2.2, incorporated herein by reference):

PDCP:
    1:M D2D broadcast communication data (i.e., IP packets) should be handled as the normal user-plane data.
    Header-compression/decompression in PDCP is applicable for 1:M D2D broadcast communication.
        U-Mode is used for header compression in PDCP for D2D broadcast operation for public safety;

RLC:
    RLC UM is used for 1:M D2D broadcast communication.
    Segmentation and Re-assembly is supported on L2 by RLC UM.
    A receiving UE needs to maintain at least one RLC UM entity per transmitting peer UE.
    An RLC UM receiver entity does not need to be configured prior to reception of the first RLC UM data unit.
    So far no need has been identified for RLC AM or RLC TM for D2D communication for user plane data transmission.

MAC:
    No HARQ feedback is assumed for 1:M D2D broadcast communication
    The receiving UE needs to know a source ID in order to identify the receiver RLC UM entity.
    The MAC header comprises a L2 target ID which allows filtering out packets at MAC layer.
    The L2 target ID may be a broadcast, group cast or unicast address.
        L2 Groupcast/Unicast: A L2 target ID carried in the MAC header would allow discarding a received RLC UM PDU even before delivering it to the RLC receiver entity.
        L2 Broadcast: A receiving UE would process all received RLC PDUs from all transmitters and aim to re-assemble and deliver IP packets to upper layers.
    MAC sub header contains LCIDs (to differentiate multiple logical channels).
    At least Multiplexing/de-multiplexing, priority handling and padding are useful for D2D.

Radio Resource Allocation

From the perspective of a transmitting UE, a Proximity Services enabled UE (ProSe-enabled UE) can operate in two modes for resource allocation:

Mode 1 refers to the eNB-scheduled resource allocation, where the UE requests transmission resources from the eNB (or Release-10 relay node), and the eNodeB (or Release-10 relay node) in turn schedules the exact resources used by a UE to transmit direct data and direct control information (e.g., Scheduling Assignment). The UE needs to be RRC_CONNECTED in order to transmit data. In particular, the UE sends a scheduling request (D-SR or Random Access) to the eNB followed by a buffer status report (BSR) in the usual manner (see also following chapter "Transmission procedure for D2D communication"). Based on the BSR, the eNB can determine that the UE has data for a ProSe Direct Communication transmission, and can estimate the resources needed for transmission.

On the other hand, Mode 2 refers to the UE-autonomous resource selection, where a UE on its own selects resources (time and frequency) from resource pools to transmits direct data and direct control information. One resource pool is defined, e.g., by the content of SIB18 (as introduced in a previous section), namely by the field commIdleTxPool, this particular resource pool being broadcast in the cell, and then commonly available for all UEs in the cell still in RRC_Idle state. As an alternative, or in addition, another resource pool can be defined by the eNB and signaled dedicatedly to the UE, namely by using the field commTxResourcePool. Although not yet finally decided, a corresponding ProSe information element is currently being standardized for TS 36.331 according to the change request R2-143565. Correspondingly, the following definition is merely to be seen as an example:

ProseCommConfig Information Element

ASN1START
ProseCommConfig-r12::=SEQUENCE {
  FFS if delta signalling should be supported for this IE
  FFS if the Rx resource pool can be provided by dedicated
    signalling   commSA-RxResourcePoolDedicated-r12
    ProseCommSA-ResourcePool-r12     OPTIONAL,
    —Need OR commTxResourcePool-r12 SEQUENCE {
  commTxPoolUse-r12 ENUMERATED {normal, exceptional),
  commSA-TxResourcePoolDedicated-r12     ProseCommSA-ResourcePool-r12,
    FFS whether to signal data Tx resources (needed if not always be inferrable from
    the SA Tx resources
  commData-TxResourcePoolDedicated-r12 ProseCommDataResourcePool-r12 OPTIONAL—Need OR
  }OPTIONAL, —Need OR
  . . .
}
ASN1STOP

| ProseCommConfig field descriptions |
|---|
| commSA-RxResourcePoolDedicated |
| Indicates the pool of resources the UE shall monitor in order to receive scheduling assignments for Prose communication. |
| commTxResourcePool |
| If included, the UE is allowed to use the indicated resources in normal or exceptional conditions, depending on commTxPoolUse. If not included or when the conditions for use are not fulfilled, a UE that wants to start direct communication involving transmissions has to request E-UTRAN to assign resources for each individual transmission, as specified in 36.321 [6]. |
| commSA-TxResourcePoolDedicated |
| Indicates TBC. |
| commData-TxResourcePoolDedicated |
| Indicates TBC. |

This ProSeCommConfig information element can be part of a network response, transmitted by the eNB, in response to a corresponding request by the UE that D2D communication is intended. For example, as illustrated in FIG. 16, the UE may transmit a D2D Communication Interest Indication to the eNB, in case the UE wants to perform D2D communication. The D2D Communication Response (e.g., as part of the RRCCommunicationReconfiguration) then could, e.g., include the above-mentioned ProseCommConfig information element.

Furthermore, the preconfigured radio resources available to a UE that is out of coverage of a cell of an eNB for D2D transmission of a SA or data, may also be categorized as Mode 2 resources.

What resource allocation mode a UE is going to use is configurable by the eNB, as explained above. Furthermore, what resource allocation mode a UE is going to use for D2D data communication may also depend on the RRC state, i.e., RRC_IDLE or RRC_CONNECTED, and the coverage state of the UE, i.e., in-coverage, out-of-coverage. A UE is considered in-coverage if it has a serving cell (i.e., the UE is RRC_CONNECTED or is camping on a cell in RRC_IDLE).

According to agreements so far in 3GPP (see change request to TS 36.300 in R2-143672, section on resource allocation) the following rules with respect to the resource allocation mode apply for the UE:

If the UE is out-of-coverage, it can only use Mode 2;
  If the UE is in-coverage, it may use Mode 1 if the eNB configures it accordingly;
  If the UE is in-coverage, it may use Mode 2 if the eNB configures it accordingly;
  When there are no exceptional conditions, UE may change from Mode 1 to Mode 2 or vice-versa only if it is configured by eNB to do so. If the UE is in-coverage, it shall use only the mode indicated by eNB configuration unless one of the exceptional cases occurs;
  The UE considers itself to be in exceptional conditions, e.g., while T311 or T301 is running;
  When an exceptional case occurs the UE is allowed to use Mode 2 temporarily even though it was configured to use Mode 1.
  While being in the coverage area of an E-UTRA cell, the UE shall perform ProSe Direct Communication Transmission on the UL carrier only on the resources assigned by that cell, even if resources of that carrier have been pre-configured, e.g., in UICC (Universal Integrated Circuit Card).

For UEs in RRC_IDLE the eNB may select one of the following options:
  The eNB may provide a Mode 2 transmission resource pool in SIB. UEs that are authorized for ProSe Direct Communication use these resources for ProSe Direct Communication in RRC_IDLE;
  The eNB may indicate in SIB that it supports D2D but does not provide resources for ProSe Direct Communication. UEs need to enter RRC_CONNECTED to perform ProSe Direct Communication transmission.

For UEs in RRC_CONNECTED:
  A UE in RRC_CONNECTED that is authorized to perform ProSe Direct Communication transmission, indicates to the eNB that it wants to perform ProSe Direct Communication transmissions when it needs to perform ProSe Direct Communication transmission;
  The eNB validates whether the UE in RRC_CONNECTED is authorized for ProSe Direct Communication transmission using the UE context received from MME;
  The eNB may configure a UE in RRC_CONNECTED by dedicated signalling with a Mode 2 resource allocation transmission resource pool that may be used without constraints while the UE is RRC_CONNECTED. Alternatively, the eNB may configure a UE in RRC_CONNECTED by dedicated signalling with a mode 2 resource allocation transmission resource pool which the UE is allowed to use only in exceptional cases and rely on Mode 1 otherwise.

This behavior of the UE with respect to the resource allocation is illustrated in a simplified manner according to the state diagrams of FIG. 7 and FIG. 8. FIG. 7 refers to the case where the UE is in the RRC_IDLE state, and differentiates between in-coverage and out-of-coverage. It should be noted that a UE which is in out-of-coverage and in RRC_IDLE can use the Mode 2 resource allocation. There are no exceptional cases at the moment defined for a UE in RRC_IDLE. On the other hand, FIG. 8 refers to the case where the UEs are in the RRC_CONNECTED state, and differentiates between in-coverage and the exceptional case. As apparent, a connected UE being in an exceptional case can use the Mode 2 resource allocation.

FIG. 9 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, in the current state-of-the-art, it uses the corresponding resources only for the corresponding transmission/reception. For example, in FIG. 9, the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 9 can be used for LTE (overlay) transmissions and/or reception.

Transmission Procedure for D2D Communication

The D2D data transmission procedure differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e., resource pool) are provided; this may be done, e.g., with the exchange of the D2D communication Interest Indication by the UE and the corresponding response D2D Communication Response as illustrated in FIG. 16, where the corresponding exemplary ProseCommConfig information element mentioned above would not include the commTxResourcePool meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;
Step 2: eNB grants UL resource (for UE to send BSR) via PDCCH, scrambled by C-RNTI;
Step 3: UE sends D2D BSR indicating the buffer status via PUSCH;
Step 4: eNB grants D2D resource (for UE to send data) via PDCCH, scrambled by D2D-RNTI.
Step 5: D2D Tx UE transmits SA/D2D data according to grant received in step 4.

A Scheduling Assignment (SA) is a compact (low-payload) message containing control information, e.g., pointer(s) to time-frequency resources for the corresponding D2D data transmissions. The content of the SA is basically in accordance with the grant received in Step 4 above. The exact details of the D2D grant and SA content are not fixed yet but as a working assumption for SA content the following agreements were achieved Frequency resource is indicated by Rel-8 UL Type 0 resource allocation (5-13 bits depending on System BW)
1 bit frequency hopping indicator (as per Rel-8)
  Note that some reinterpretation of the indexing is to be defined so that hopping does not use PRBs outside the configured resource pool for mode 2.
Only single-cluster resource allocations are valid
  this implies that if there are gaps in the resource pool in the frequency domain, a resource allocation shall not straddle a gap
No RV indicator in SA
RV pattern for data: {0, 2, 3, 1}.

On the other hand, for Mode 2 resource allocation, above steps 1-4 are basically not necessary, and the UE autonomously selects resources for the SA and D2D data transmission from the transmission resource pool(s) configured and provided by the eNB.

FIG. 10 exemplarily illustrates the transmission of the Scheduling Assignment and the D2D data for two UEs, UE-A and UE-B, where the resources for sending the scheduling assignments are periodic, and the resources used for the D2D data transmission are indicated by the corresponding Scheduling Assignment.

Resource Pool for Scheduling Assignment and D2D data

The resource pool for Scheduling Assignment (SA) and D2D data when the UE is out-of-coverage can be configured as below:

The resource pool used for reception of SA is pre-configured.
  The resource pool used for transmission of SA is pre-configured.
  The resource pool used for reception of D2D data is pre-configured.
  The resource pool used for transmission of D2D data is pre-configured.

The resource pool for Scheduling Assignment (SA) when the UE is in-coverage can be configured as below:

The resource pool used for reception of SA is configured by the eNB via
  RRC, in dedicated or broadcast signalling.
  The resource pool used for transmission of SA is configured by the eNB via RRC if Mode 2 resource allocation is used
  The SA resource pool used for transmission is not known to the UE if Mode 1 resource allocation is used.
  The eNB schedules the specific resource(s) to use for Scheduling Assignment transmission if Mode 1 resource allocation is used. The specific resource assigned by the eNB is within the resource pool for reception of Scheduling Assignment that is provided to the UE.

UE Coverage States for D2D

As already mentioned before (see, e.g., FIG. 7 and FIG. 8), the resource allocation method for D2D communication depends apart from the RRC state, i.e., RRC_IDLE and RRC_CONNECTED, also on the coverage state of the UE, i.e., in-coverage, out-of-coverage. A UE is considered in-coverage if it has a serving cell (i.e., the UE is RRC_CONNECTED or is camping on a cell in RRC_IDLE).

The two coverage states mentioned so far, i.e., in-coverage (IC) and out-of-coverage (OOC), are further distinguished into sub-states for D2D. FIG. 11 shows the four different states a D2D UE can be associated to, which can be summarized as follows:

State 1: UE1 has uplink and downlink coverage. In this state the network controls each D2D communication session. Furthermore, the network configures whether UE1 should use resource allocation Mode 1 or Mode 2.

State 2: UE2 has downlink but no uplink coverage, i.e., only DL coverage. The network broadcasts a (contention-based) resource pool. In this state the transmitting UE selects the resources used for SA and data from a resource pool configured by the network; resource allocation is only possible according to Mode 2 for D2D communication in such a state.

State 3: Since UE3 has no uplink and downlink coverage, the UE3 is strictly speaking already considered as out-of-coverage (OOC). However, UE3 is in the coverage of some UEs which are themselves (e.g., UE1) in the coverage of the cell, i.e., those UEs can be also referred as CP-relay UEs, therefore the area of the state 3 UEs in FIG. 11 can be denoted as CP UE-relay coverage area. UEs in this state 3 are also referred to as OOC-state 3 UEs. In this state the UEs receive some cell specific information which is sent by the eNB (SIB) and forwarded by the CP UE-relay UEs in the coverage of the cell via PD2DSCH to the OOC-state 3 UEs. A (contention-based) network-controlled resource pool is signalled by PD2DSCH.

State 4: UE4 is out of coverage and does not receive PD2DSCH from other UEs which are in the coverage of a cell. In this state, which is also referred to as state 4 OOC, the transmitting UE selects the resources used for the data transmission from a pre-configured pool of resources.

The reason to distinguish between state 3 OOC and state 4 OOC is mainly to avoid potentially strong interference between D2D transmissions from out-of coverage devices and legacy E-UTRA transmissions. In general D2D-capable UEs will have preconfigured resource pool(s) for transmission of D2D SAs and data for use while out of coverage. If these out-of-coverage UEs transmit on these preconfigured resource pools near cell boundaries, then, interference between the D2D transmissions and in-coverage legacy transmissions could have a negative impact on communications within the cell. If D2D-enabled UEs within coverage forwarded the D2D resource pool configuration to those out-of-coverage devices near the cell boundary, then, the out-of-coverage UEs could restrict their transmissions to the resources specified by the eNode B and therefore minimise interference with legacy transmissions in coverage. Thus, RAN1 introduced a mechanism where in-coverage UEs are forwarding resource pool information and other D2D related configurations to those devices just outside the coverage area (state 3 UEs).

The Physical D2D synchronization channel (PD2DSCH) is used to carry this information about in-coverage D2D resource pools to the UEs in network proximity, so that resource pools within network proximity are aligned. The detailed content of the PD2DSCH is not finalized yet though.

D2D Discovery

ProSe (Proximity based Services) Direct Discovery is defined as the procedure used by the ProSe-enabled UE to discover other ProSe-enabled UE(s) in its proximity using E-UTRA direct radio signals via the PC5 interface. FIG. 12 schematically illustrates a PC5 interface for device-to-device direct discovery.

The upper layer handles authorization for announcement and monitoring of discovery information. For this purpose, UEs have to exchange predefined signals, referred to as discovery signals. By checking discovery signals periodically, a UE maintains a list of proximity UEs in order to establish a communication link when it is needed. Discovery signals should be detected reliably, even in low Signal-to-Noise Ratio (SNR) environments. To allow discovery signals to be transmitted periodically, resources for discovery signals should be assigned.

There are two types of ProSe Direct Discovery: open and restricted. Open is the case where there is no explicit permission that is needed from the UE being discovered, whereas restricted discovery only takes place with explicit permission from the UE that is being discovered.

ProSe Direct Discovery can be a standalone service enabler in a discovering UE, which enables the discovering UE to use information from a discovered UE for certain applications. As an example, the information transmitted in ProSe Direct Discovery may be "find a taxi nearby", "find me a coffee shop", "find me the nearest police station" and the like. Through ProSe Direct Discovery a discovery UE can retrieve needed information. Additionally, depending on the information obtained, ProSe Direct Discovery can be used for subsequent actions in the telecommunication system, such as, initiating a ProSe Direct Communication.

ProSe Direct Discovery Models

ProSe Direct Discovery is based on several discovery models. An overview is given in the following. The models for ProSe Direct Discovery are defined in more detail in 3GPP TS 23.303 V12.1.0, section 5.3 which is enclosed herein by reference.

Model A ("I am here")

Model A is also indicated as "I am here", since the announcing UE broadcasts information about itself, such as its ProSe Application Identities or ProSe UE Identities in the discovery message, thereby identifying itself and communicating to the other parties of the communication system that it is available.

According to Model A, two roles for ProSe-enabled UEs that are participating in ProSe Direct Discovery are defined. ProSe-enabled UE can have the function of Announcing UE and Monitoring UE. An announcing UE announces certain information that could be used by UEs in the proximity that have permission to discover. A Monitoring UE monitors certain information of interest in the proximity of announcing UEs.

In this Model A the announcing UE broadcasts discovery messages at pre-defined discovery intervals, and the monitoring UEs that are interested in these messages read them and process them.

Model B ("Who is There?"/"are You There?")

This model defines two roles for the ProSe-enabled UEs that are participating in ProSe Direct Discovery:

Discoverer UE: The UE transmits a request containing certain information about what it is interested to discover;

Discoveree UE: The UE that receives the request message can respond with some information related to the discoverer's request.

Model B is equivalent to "who is there/are you there" since the discoverer UE transmits information about other UEs that would like to receive responses from. The transmitted information can be, for example, about a ProSe Application Identity corresponding to a group. The members of the group can respond to said transmitted information.

According to this Model B, two roles for the ProSe-enabled UEs that are participating in ProSe Direct Discovery are defined: discoverer UE and discoveree UE. The discoverer UE transmits a request containing certain information about what it is interested to discover. On the other hand, the discoveree UE receives the request message and can respond with some information related to the discoverer UE's request.

The content of the discovery information is transparent to the Access Stratum (AS), which does not know the content of discovery information. Thus, no distinction is made in the Access Stratum between the various ProSe Direct Discovery models and types of ProSe Direct Discovery. The ProSe Protocol ensures that it delivers only valid discovery information to AS for announcement.

The UE can participate in announcing and monitoring of discovery information in both RRC_IDLE and RRC_CONNECTED state as per eNB configuration. The UE announces and monitors its discovery information subject to the half-duplex constraints.

Types of Discovery

FIG. 13 illustrates a diagram showing the IDLE and CONNECTED mode in the reception of discovery resources in D2D communication, and with regard to the resource allocation procedure.

D2D communication may either be network-controlled, where the operator manages the switching between direct transmissions (D2D) and conventional cellular links, or the direct links may be managed by the devices without operator control. D2D allows combining infrastructure-mode and ad-hoc communication.

Generally, device discovery is needed periodically. Further, D2D devices utilize a discovery message signalling protocol to perform device discovery. For example, a D2D-enabled UE can transmit its discovery message, and another D2D-enabled UE receives this discovery message and can use the information to establish a communication link. An advantage of a hybrid network is that, if D2D devices are also in communication range of network infrastructure, network entities, like eNB, can additionally assist in the transmission or configuration of discovery messages. Coordination/control by the eNB in the transmission or configuration of discovery messages is also important to ensure that D2D messaging does not create interference with the cellular traffic controlled by the eNB. Additionally, even if some of the devices are outside of the network coverage range, in-coverage devices can assist in the ad-hoc discovery protocol.

At least the following two types of discovery procedures are defined for the purpose of terminology definition used further in the description.

Type 1: A resource allocation procedure where resources for announcing of discovery information are allocated on a non-UE-specific basis, further characterized by:
The eNB provides the UE(s) with the resource pool configuration used for announcing discovery information. The configuration may be signalled in SIB.
The UE autonomously selects radio resource(s) from the indicated resource pool and announces discovery information.
The UE can announce discovery information on a randomly selected discovery resource during each discovery period.

Type 2: A resource allocation procedure where resources for announcing of discovery information are allocated on a per UE specific basis, further characterized by:
The UE in RRC_CONNECTED may request resource (s) for announcing of discovery information from the eNB via RRC. The eNB assigns resource(s) via RRC.
The resources are allocated within the resource pool that is configured in UEs for monitoring.

The resources are, according to the Type 2 procedure, for example allocated semi-persistently for discovery signal transmission.

In the case UEs are in RRC_IDLE modus, the eNB may select one of the following options:
The eNB may provide a Type 1 resource pool for discovery information announcement in SIB. UEs that are authorized for ProSe Direct Discovery use these resources for announcing discovery information in RRC_IDLE.
The eNB may indicate in SIB that it supports D2D but does not provide resources for discovery information announcement. UEs need to enter RRC Connected in order to request D2D resources for discovery information announcement.

For UEs in RRC_CONNECTED status, a UE authorized to perform ProSe Direct Discovery announcement indicates to the eNB that it wants to perform D2D discovery announcement. Then, the eNB validates whether the UE is authorized for ProSe Direct Discovery announcement using the UE context received from MME. The eNB may configure the UE to use a Type 1 resource pool or dedicated Type 2 resources for discovery information announcement via dedicated RRC signalling (or no resource). The resources allocated by the eNB are valid until a) the eNB de-configures the resource (s) by RRC signalling or b) the UE enters IDLE.

Receiving UEs in RRC_IDLE and RRC_CONNECTED monitor both Type 1 and Type 2 discovery resource pools as authorised. The eNB provides the resource pool configuration used for discovery information monitoring in SIB. The SIB may contain discovery resources used for announcing in neighbour cells as well.

Radio Protocol Architecture

FIG. 14 schematically illustrates a Radio Protocol Stack (AS) for ProSe Direct Discovery.

The AS layer interfaces with upper layer (ProSe Protocol). Accordingly, the MAC layer receives the discovery information from the upper layer (ProSe Protocol). In this context, the IP layer is not used for transmitting the discovery information. Further, the AS layer has a scheduling function, according to which the MAC layer determines the radio resource to be used for announcing the discovery information received from upper layer. In addition, the AS layer has the function of generating Discovery PDU, according to which the MAC layer builds the MAC PDU carrying the discovery information and sends the MAC PDU to the physical layer for transmission in the determined radio resource. No MAC header is added.

In the UE, the RRC protocol informs the discovery resource pools to MAC. RRC also informs allocated Type 2 resource for transmission to MAC. There is no need for a MAC header. The MAC header for discovery does not comprise any fields based on which filtering on Layer 2 could be performed. Discovery message filtering at the MAC level does not seem to save processing or power compared to performing filtering at the upper layers based on the ProSe UE- and/or ProSe Application ID. The MAC receiver forwards all received discovery messages to upper layers. MAC will deliver only correctly received messages to upper layers.

In the following it is assumed that L1 (PHY) indicates to MAC whether a discovery messages has been received correctly. Further, it is assumed that the Upper Layers guarantee to deliver only valid discovery information to the Access Stratum.

D2D Synchronization

The main task of synchronization is to enable the receivers to acquire a time and frequency reference. Such reference may be exploited for at least two goals: 1) aligning the receiver window and frequency correction when detecting D2D channels and 2) aligning the transmitter timing and parameters when transmitting D2D channels. The following channels have been defined in 3GPP so far for the purpose of synchronization:

D2DSS D2D Synchronization Signal
PD2DSCH Physical D2D Synchronization Channel
PD2DSS Primary D2D Synchronization Signal
SD2DSS Secondary D2D Synchronization Signal Furthermore, the following terminology with respect to synchronization was agreed in 3GPP, and will be exemplarily used in the rest of the application.

D2D Synchronization Source: A node that at least transmits a D2D synchronization signal. A D2D synchronization source can be basically an eNB or a D2D UE.

D2D Synchronization Signal: A signal from which a UE can obtain timing and frequency synchronization D2D synchronization could be seen as a procedure which is similar to LTE cell search. In order to allow both NW control and efficient synchronization for partial/outside coverage scenarios, the following receiver and transmitter synchronization procedures are currently under discussion within 3GPP:

Receiver Synchronization

The ProSe enabled UE regularly searches for LTE cells (according to LTE mobility procedures) and for D2DSS/PD2DSCH transmitted by Synchronization Source (SS) UEs.

If any suitable cell is found, the UE camps on it and follows the cell synchronization (according to LTE legacy procedures).

If any suitable D2DSS/PD2DSCH transmitted by SS UEs are found, the UE synchronizes its receiver to all incoming D2DSS/PD2DSCH (subject to UE capabilities) and monitors them for incoming connections (Scheduling Assignments). It should be noted that the D2DSS transmitted by a D2D Synchronization Source that is an eNodeB shall be the Rel-8 PSS/SSS (Primary and Secondary Synchronization Signals). D2D Synchronization Sources which are eNodeBs have a higher priority than D2D Synchronization Sources which are UEs.

Transmitter Synchronization

The ProSe enabled UE regularly searches for LTE cells (according to LTE mobility procedures) and for D2DSS/PD2DSCH transmitted by SS UEs;

If any suitable cell is found, the UE camps on it and follows the cell synchronization for D2D signals transmission. In such a case, the network may configure the UE to transmit D2DSS/PD2DSCH following the cell synchronization.

If no suitable cell is found, the UE verifies if any of the incoming D2DSS/PD2DSCH may be relayed further (i.e., the max hop count has not been reached), then (a) if an incoming D2DSS/PD2DSCH that may be relayed further is found, the UE adapts its transmitter synchronization to it and transmits D2DSS/PD2DSCH accordingly; or (b) if an incoming D2DSS/PD2DSCH that may be relayed further is NOT found, the UE acts as independent synchronization source and transmit D2DSS/PD2DSCH according to any internal synchronization reference.

Further details on the synchronization procedure for D2D can be found in TR 36.843 V12.0.1, clause 7, incorporated herein by reference.

Cell Selection and RRC Connection Establishment

FIG. 15 illustrates in a simplified and exemplary manner the prior art message exchange between a UE and an eNB for selecting a cell and establishing an RRC connection. Cell selection in step 2 is based, e.g., on 3GPP TS 36.304, e.g., chapter 5.2.3 of V12.1.0, incorporated herein by reference. A UE that is not camping on any WAN (Wide Area Network, e.g., LTE) cell is considered Out of Coverage. Cell Camping may be based on the Cell Selection Criteria/Process as defined in Chapter 5.2.3 of 3GPP TS 36.304 V12.1.0. Therefore, before completion of step 2, the UE is generally considered in Out of Coverage (OOC).

Once the Cell Selection is successful and the UE is camped (on a Suitable Cell or on an Acceptable cell), it is in RRC Idle state. UE Continues to be in RRC Idle state until step 7, i.e., until it receives RRCConnectionSetup message from the network, after which it changes to RRC Connected state.

BRIEF SUMMARY

One non-limiting and exemplary embodiment provides an improved method for allocating radio resources to a transmitting terminal for performing a direct communication transmission over a direct link connection, which may facilitate mitigating the problems discussed above. The independent claims provide one non-limiting and exemplary embodiment. Advantageous embodiments are subject to the dependent claims.

In one general aspect, the techniques disclosed here feature a method for allocating radio resources to a transmitting terminal for performing a direct communication transmission over a direct link connection to a receiving terminal in a communication system. This method comprises the following steps performed by the transmitting terminal: receiving from a base station a system information broadcast, which comprises information on a temporary transmission radio resource pool, indicating radio resources usable by those transmitting terminals receiving the system information broadcast for performing a direct communication transmission to a receiving terminal over a direct link connection, and which comprises information on configuration information on the temporary transmission radio resource pool, the configuration information limiting the amount of time that the temporary transmission radio resource pool is usable by the transmitting terminal. A corresponding terminal and base station for participating in the method are provided.

Correspondingly, in one general aspect, the techniques disclosed here feature a transmitting terminal for performing a direct communication transmission over a direct link connection to a receiving terminal in a communication system. The transmitting terminal is preconfigured with a preconfigured transmission radio resource pool, indicating radio resources usable by the transmitting terminal for performing the direct communication transmission to a receiving terminal over the direct link connection, wherein the preconfigured transmission radio resource pool is usable when the transmitting terminal is in coverage of a cell of a base station.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE FIGURES

In the following exemplary embodiments are described in more detail with reference to the attached figures and drawings.

FIG. 19 illustrates the message exchange for a failed RRC connection establishment procedure, FIG. 20 illustrates those periods where D2D communication transmission is not possible for a UE, FIGS. 21, 22 illustrate how the UE can apply T-RPT patterns to subframes for Mode 1 respective Mode 2 resources.

DETAILED DESCRIPTION

Figure 1:
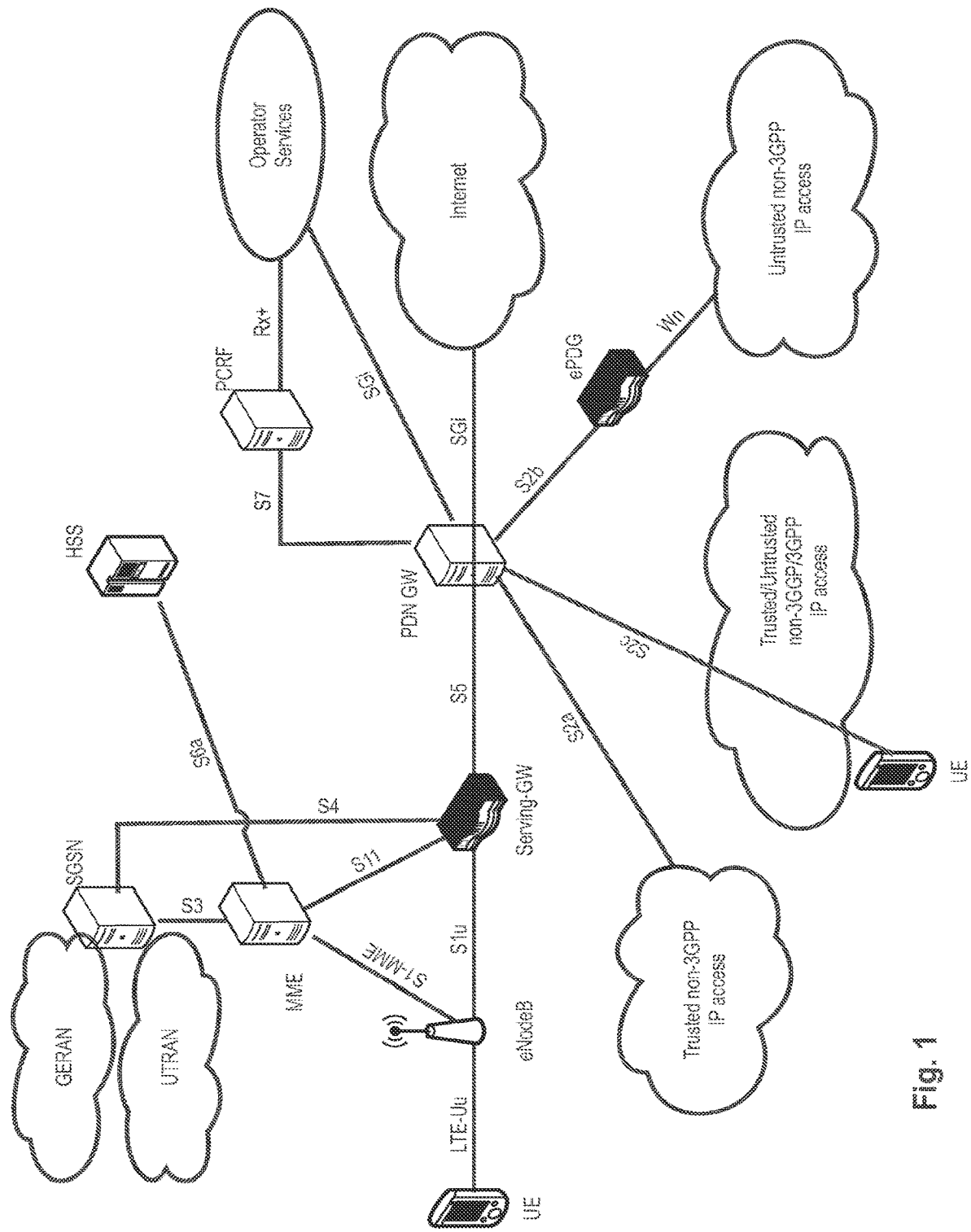
FIG. 1 shows an exemplary architecture of a 3GPP LTE system.
Figure 2:
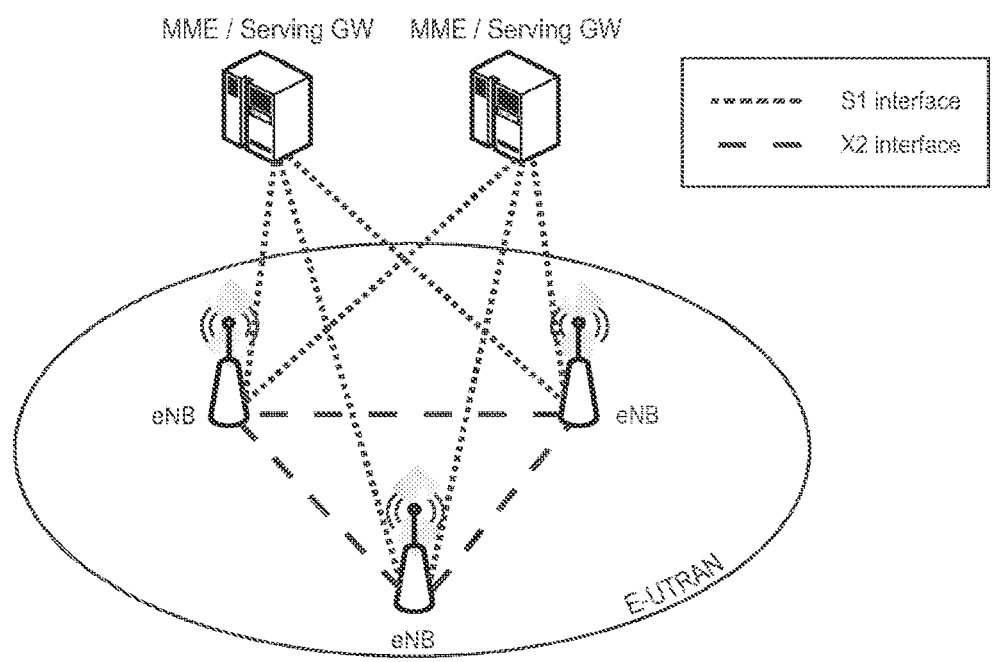
FIG. 2 shows an exemplary overview of the overall E-UTRAN architecture of 3GPP LTE.
Figure 3:
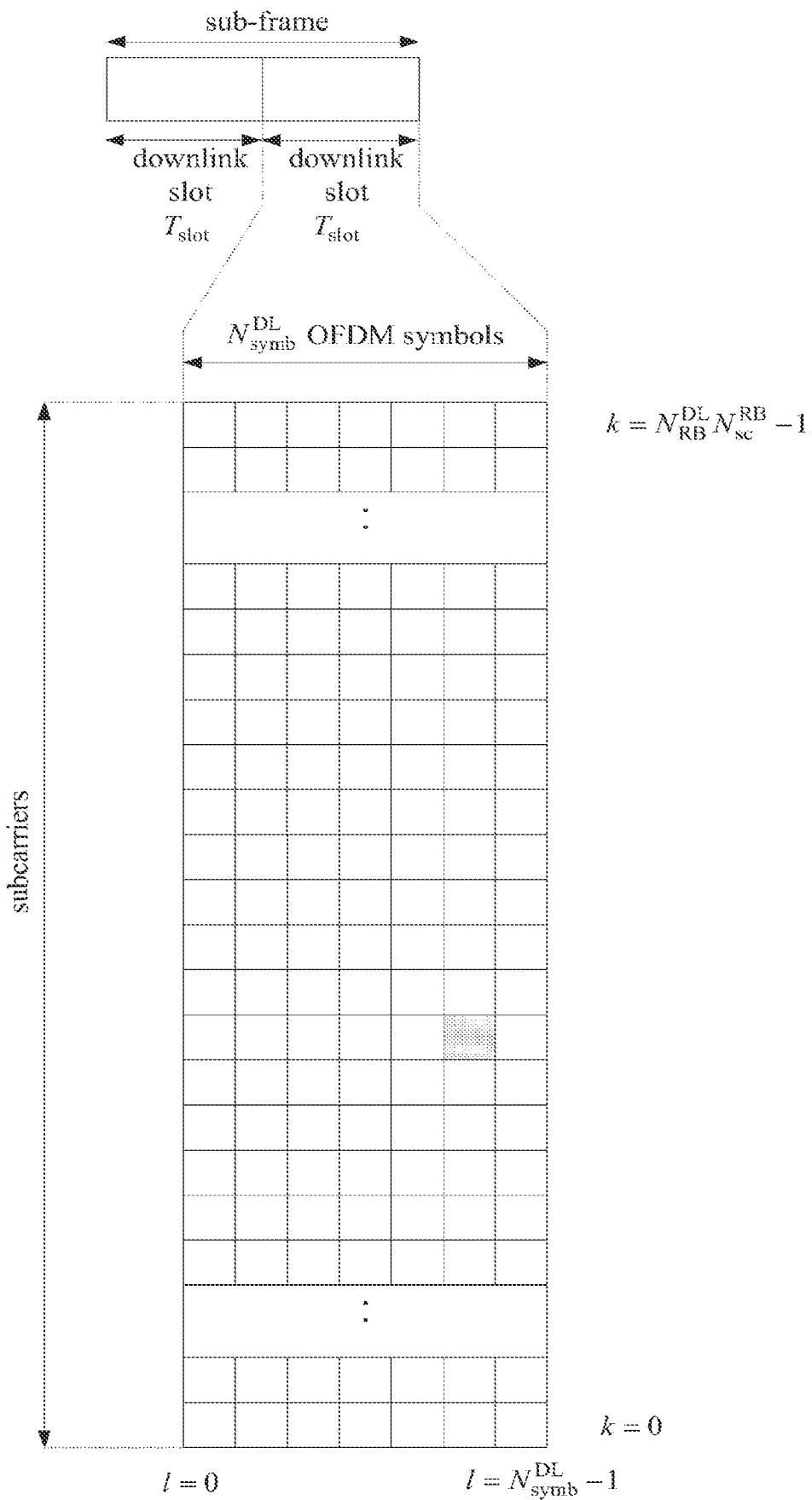
FIG. 3 shows exemplary subframe boundaries on a downlink component carrier as defined for 3GPP LTE (Release 8/9)
Figure 4:
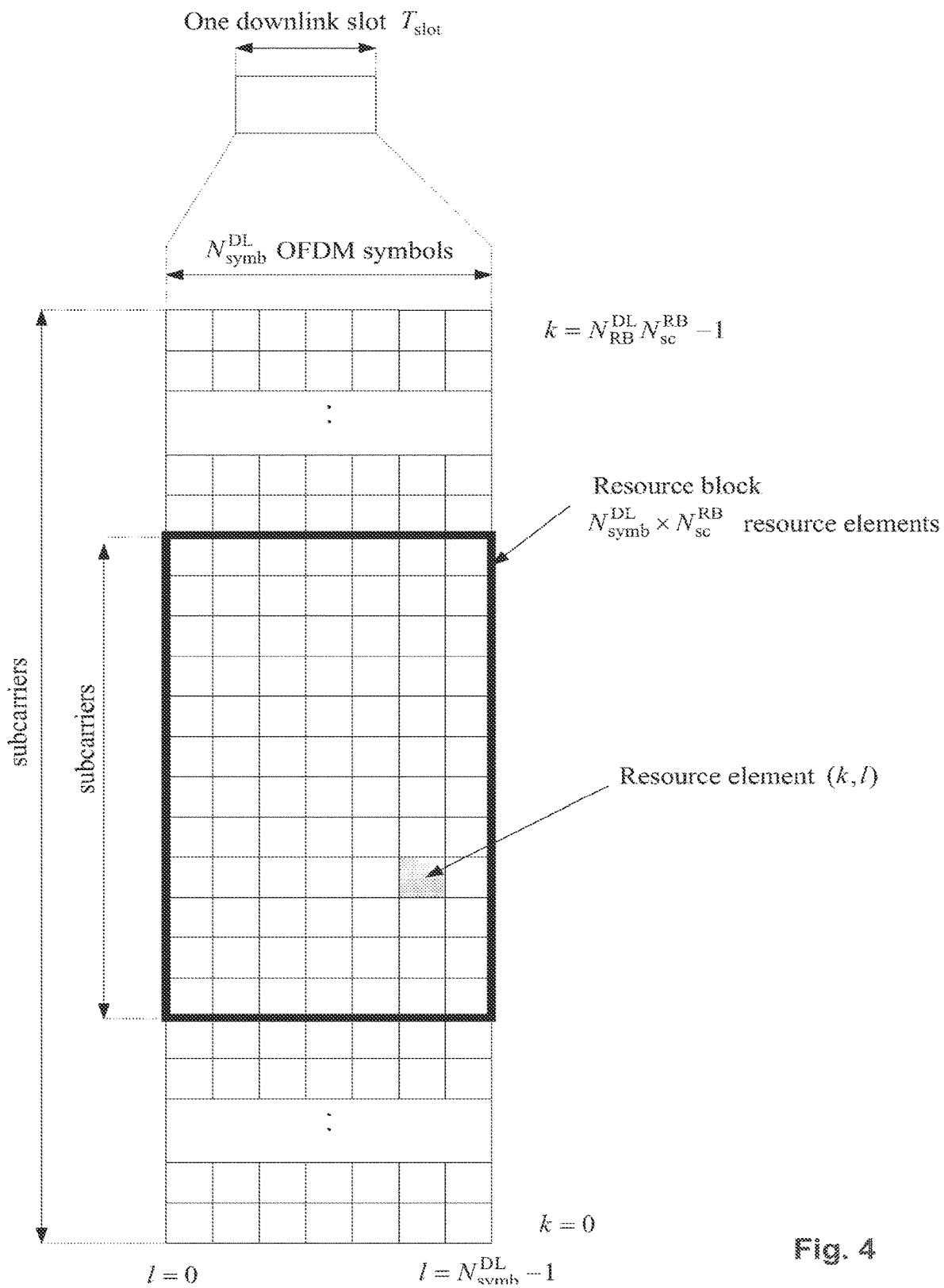
FIG. 4 shows an exemplary downlink resource grid of a downlink slot as defined for 3GPP LTE (Release 8/9)
Figure 5:
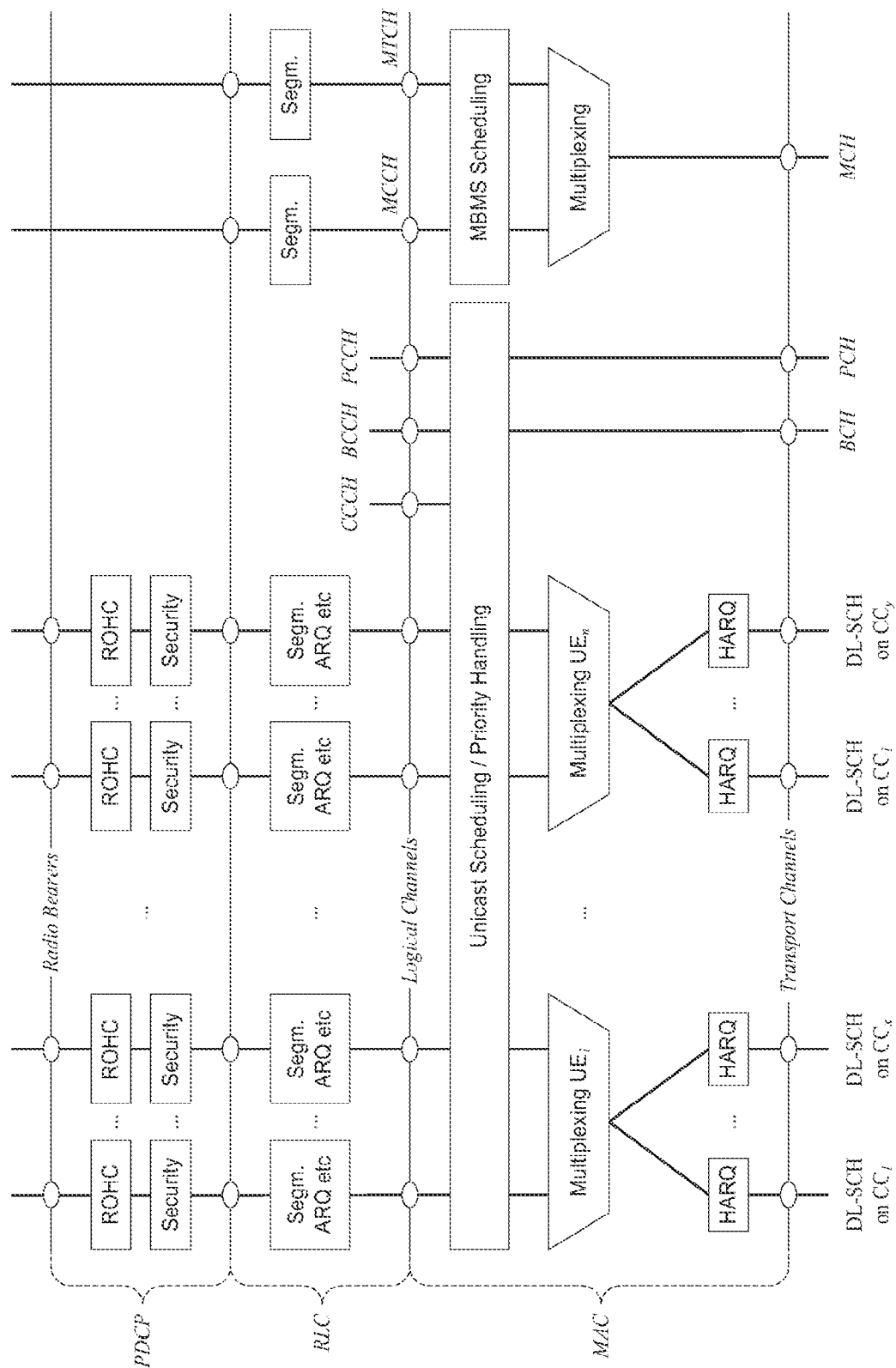
FIGS. 5 & 6 show the 3GPP LTE-A (Release 10) Layer 2 structure with activated carrier aggregation for the downlink and uplink, respectively, FIGS. 7 & 8 give an overview of the resource allocation mode(s) and transitions between the resource allocation modes available to a terminal when in RRC_Idle, RRC_Connected, in-coverage and out-of-coverage of a cell.
Figure 6:
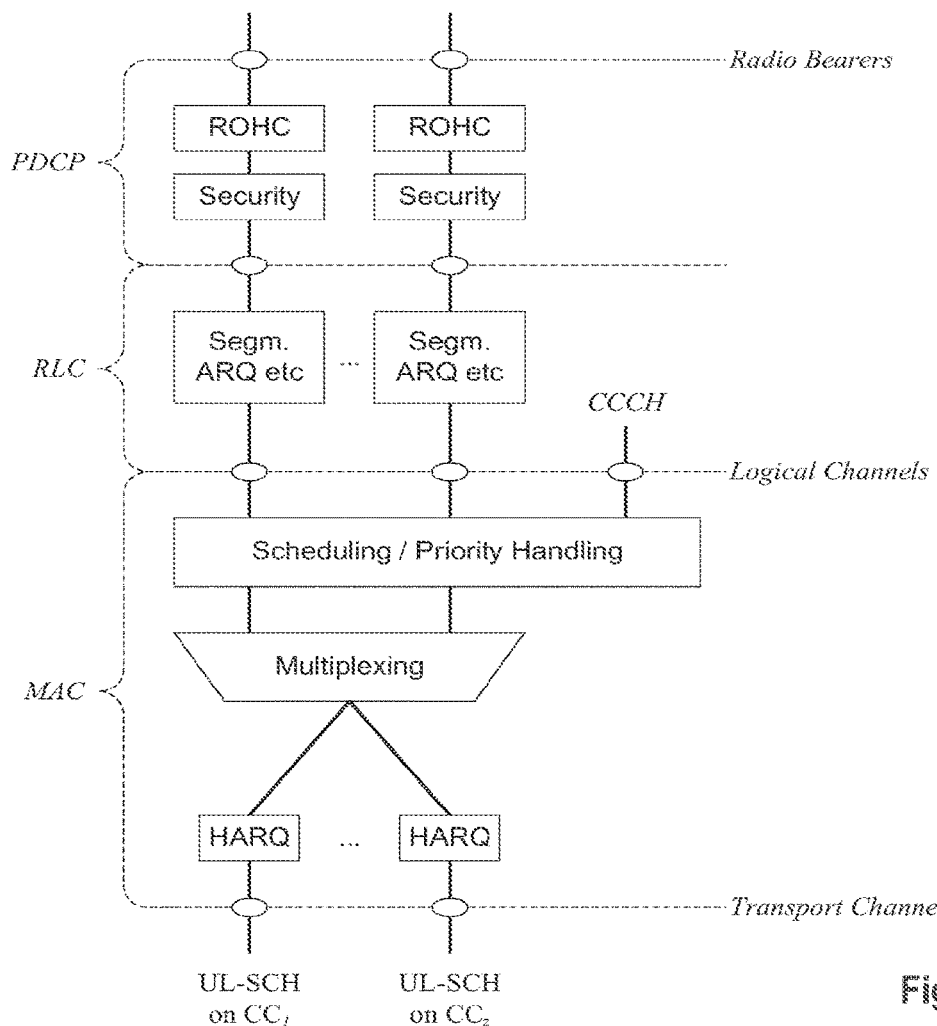
Figure 7:
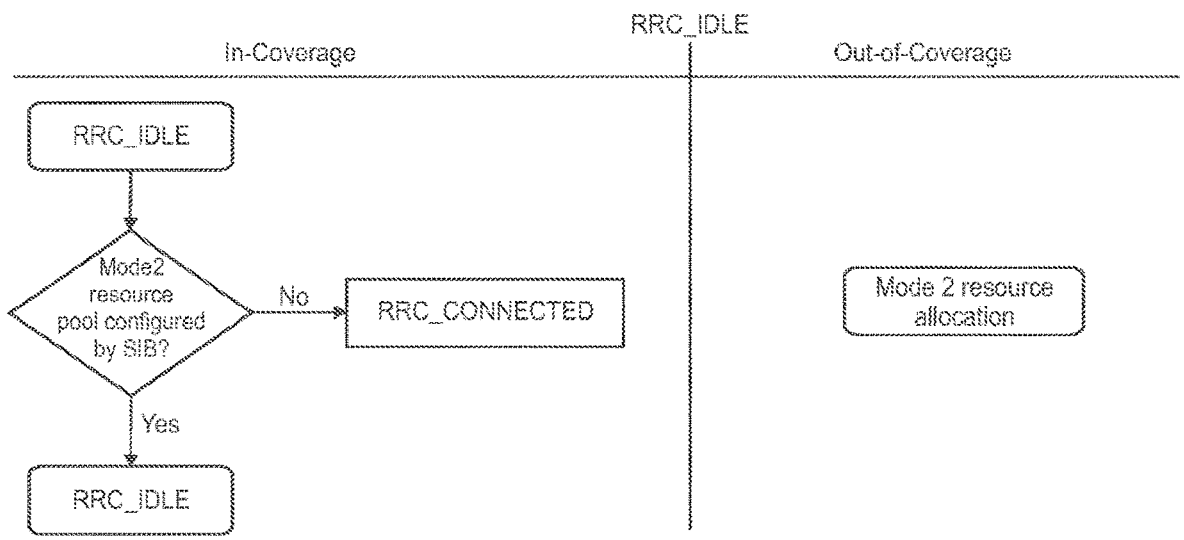
Figure 8:
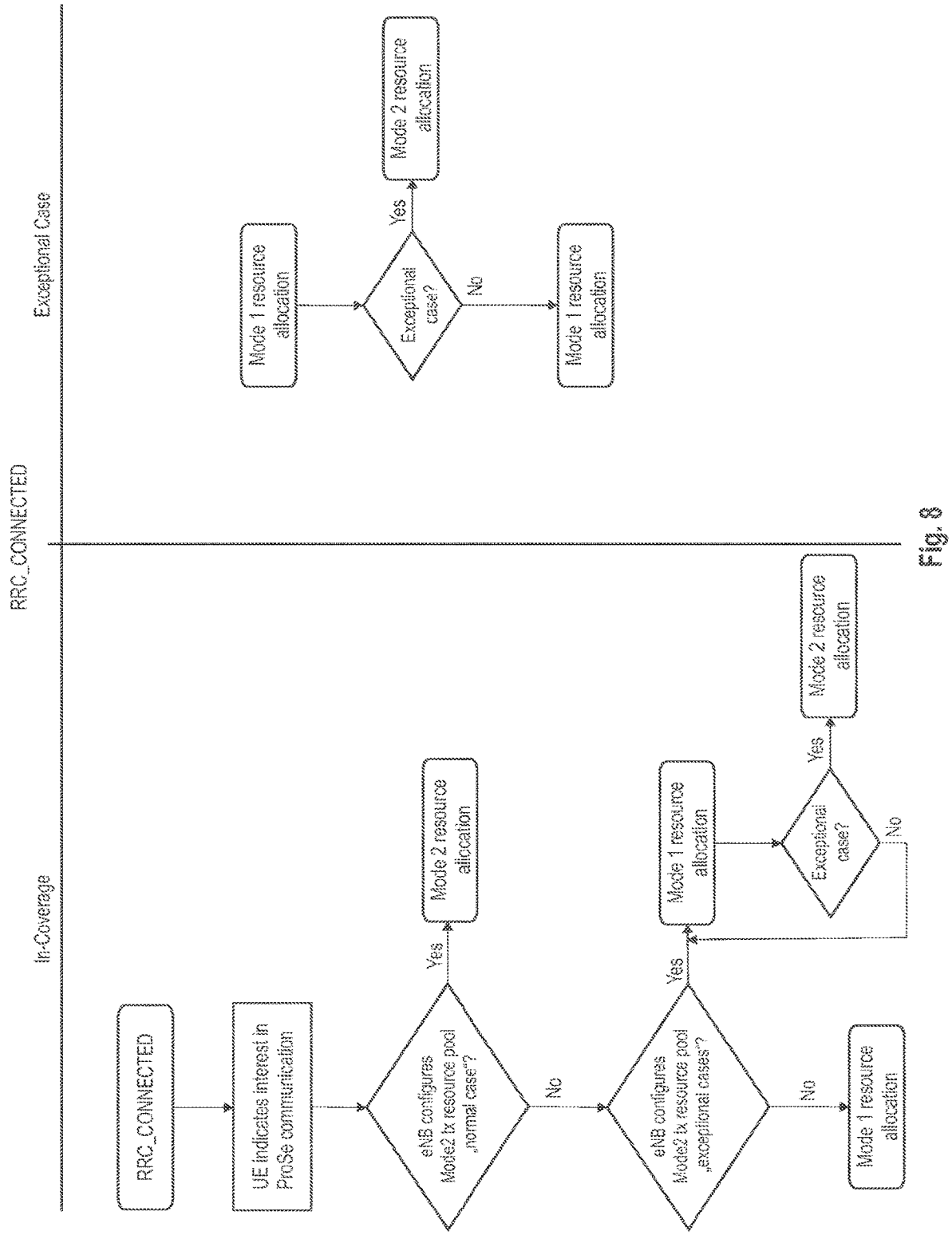
Figure 9:
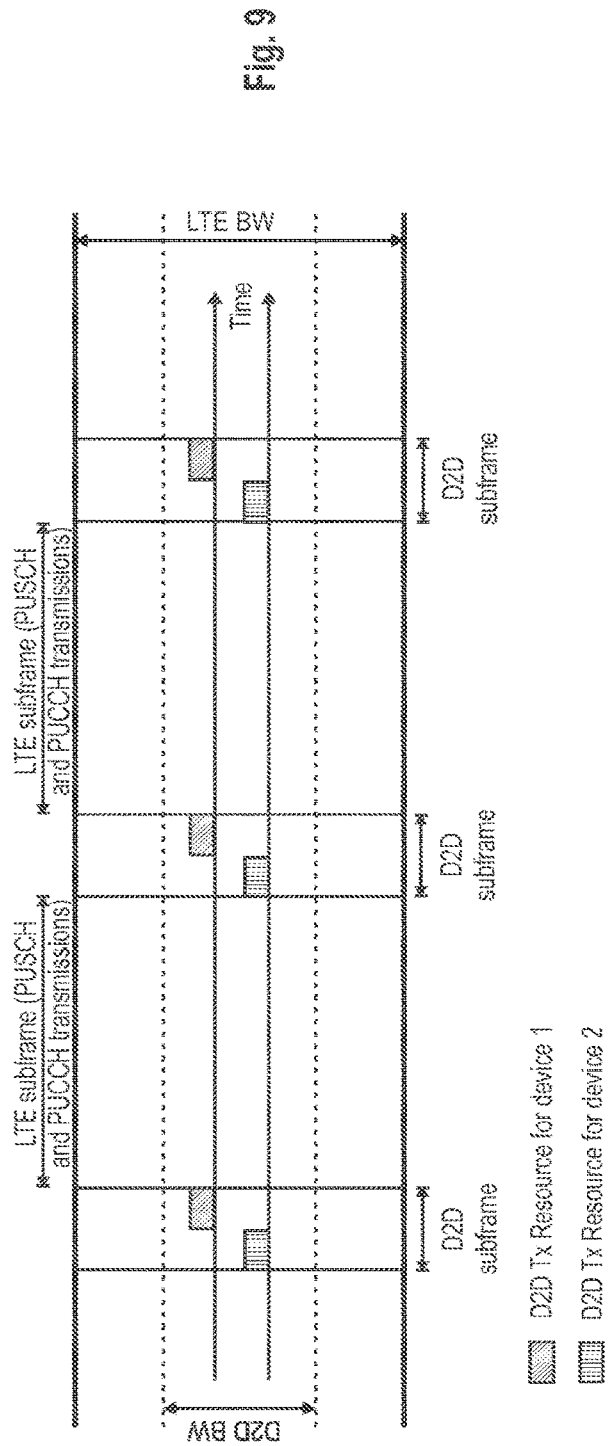
FIG. 9 illustrates the use of transmission/reception resources for overlay (LTE) and underlay (D2D) systems.
Figure 10:
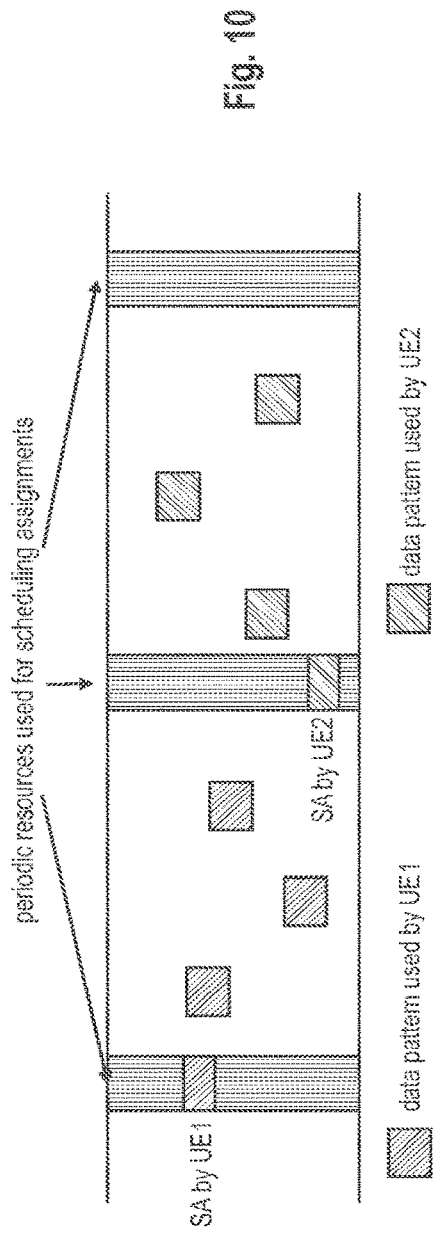
FIG. 10 illustrates the transmission of the Scheduling Assignment and the D2D data for two UEs.

It should be noted that the embodiments may be advantageously used for example in a mobile communication system such as 3GPP LTE-A (Release 10/11/12) communication systems as described in the Technical Background section above, but the embodiments are not limited to its use in this particular exemplary communication networks.

A mobile station or mobile node or user terminal is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

A "transmitting terminal" as used in the set of claims and in the application shall refer to a user terminal in the role of the transmitter. A "receiving terminal" conversely shall refer to a user terminal in the role of the receiver. The adjective "transmitting" and "receiving" is only meant to clarify a temporary operation/role.

A "direct communication transmission" as used in the set of claims and in the application shall exemplarily refer to a device—to-device (D2D) communication as currently discussed for LTE release 12. The term "direct link connection" correspondingly shall exemplarily refer to a connection or communication channel over the PC5 interface directly connecting two D2D user terminals which allows the exchange of data directly without the involvement of the network. In other words, a communication channel is established between two user equipments in the communication system, which are close enough for directly exchanging data, thereby bypassing the eNodeB (base station).

The term "radio connection establishment procedure" as used in the set of claims and in the application may be understood as including or not including the random access procedure. Correspondingly, initiating the radio connection establishment procedure can be understood as being equivalent to transmitting a preamble of the random access procedure, or as being equivalent to transmitting the RRC Connection Request message. Correspondingly, in the context of 3GPP LTE, the radio connection establishment procedure may be the random access procedure followed by the RRC connection establishment procedure.

The term "dedicated radio resources" as used in the set of claims and in the application shall be understood as radio resources being assigned by a base station (eNode B) specifically to a particular terminal. In itself, the dedicated radio resources can be either a Mode 1 or Mode 2 resource, as discussed in the background section. This term shall be seen in contrast to "common radio resources" which may be commonly used by terminals in the cell; for instance, the transmission radio resource pool defined by the system information (for example SIB18) is broadcast in the cell, and thus the same radio resources are available for use by terminals receiving this system information.

The expression "initiate a radio connection establishment procedure" and similar expressions shall be understood as that the terminal is required to try establishing a radio connection with the base station, however keeping in mind that the radio connection establishment procedure may fail. In other words, although the terminal is required to try establishing a radio connection, the terminal may only succeed in initiating a corresponding radio connection establishment procedure but may not succeed to continue the radio connection establishment procedure to successfully establish the radio connection. As such, this expression shall be seen making this requirement of initiating a radio connection establishment procedure independent from the outcome, i.e., success (e.g., reception of RRC Connection Setup message) or failure (e.g., reception of RRC Connection Rejection message) of establishing the radio connection.

The expression of a "transmission radio resource pool being usable", (and similar expressions) as used in the set of claims and in the application shall be understood in a broad manner such that resources must not but can be selected from the transmission radio resource pool and be used by the terminal, in case the terminal would like to perform a direct communication transmission (e.g., of a scheduling assignment or direct communication data). Correspondingly, the expression of a transmission radio resource pool being used (and similar expressions), shall be understood in a broad manner such that the terminal indeed intends to perform a direct communication transmission and selects appropriate resources from the transmission radio resource pool and performs said direct communication transmission on said selected resources.

The expression of "in coverage" as used in the set of claims and in the application is to be broadly understood as that a terminal is considered in coverage if it has successfully selected a cell, independent from whether the terminal is in an idle or connected state. The cell selection criteria are defined in TS 36.304. All in-coverage UEs can receive signaling from the network, either using the broadcast messages (in Idle state and in Connected State) or using dedicated (i.e., one-to-one between the UE and the network) messages in Connected state. For example, a UE is considered in coverage if it has a serving cell (i.e., the UE is RRC_Connected or is camping on a cell in RRC_Idle). The expression "out of coverage" is thus to be understood conversely.

The term "preconfigured" as used in the set of claims and in the application is to be broadly understood in that the corresponding resources of the resource pool are known to the terminals even without receiving any information from the radio access; i.e., a preconfigured radio resource pool is available independently from the cells and the system information broadcast therein.

The term "radio resources" as used in the set of claims and in the application is to be broadly understood as referring to physical radio resources, such as time-frequency resources.

Figure 15:
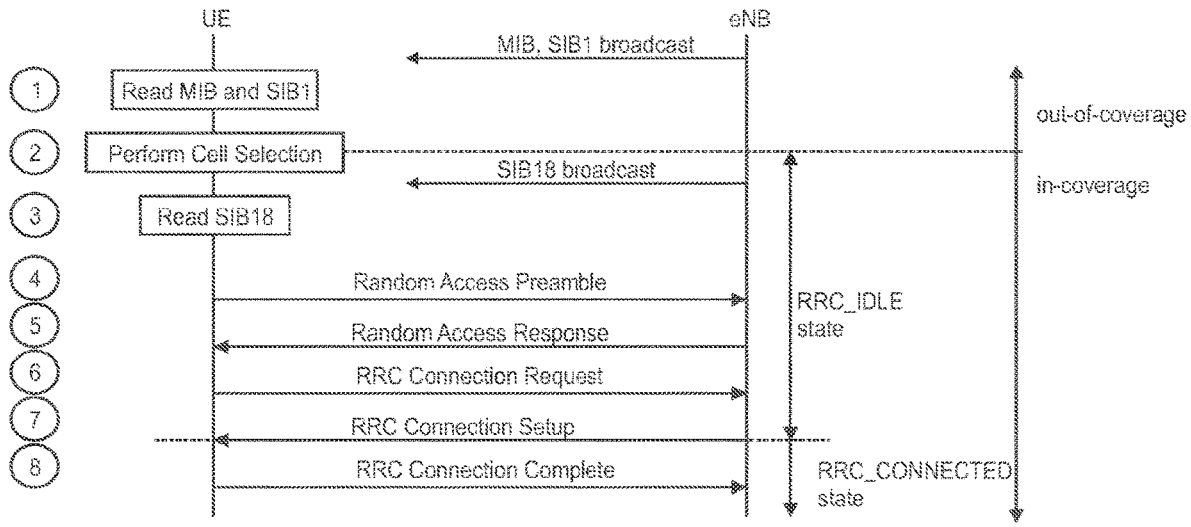
FIG. 15 illustrates an exemplary prior art message exchange between a UE and an eNodeB for selecting a cell and establishing an RRC connection.
Figure 18:
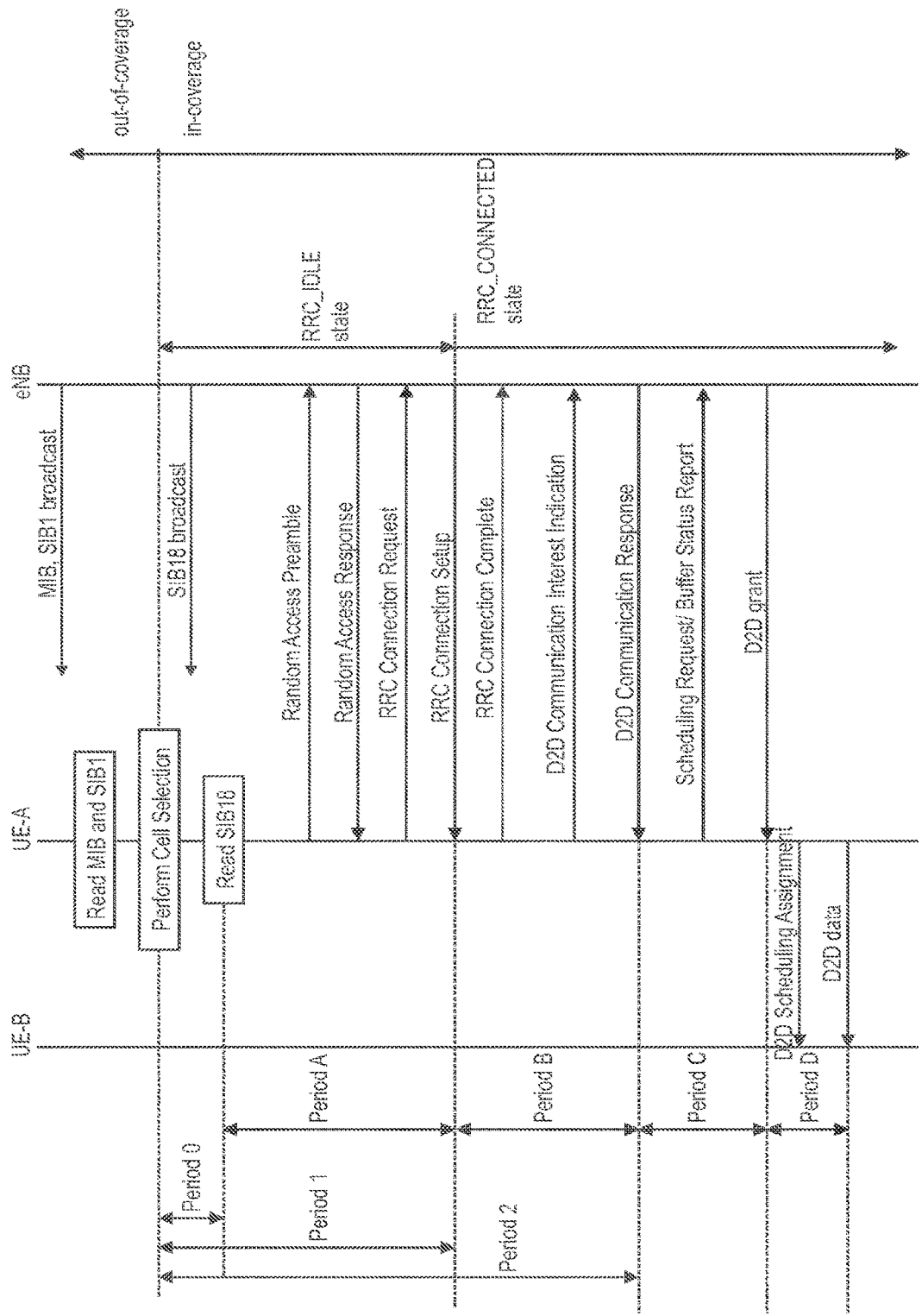
FIG. 18 is an extension of FIG. 15, exemplarily illustrating the prior art message exchange for selecting a cell, establishing an RRC connection, UE-A indicating interest in D2D communication, and requesting dedicated radio resources for a D2D communication transmission and additionally indicating various different time periods.

As explained in the background section, a UE can use different resources for D2D direct communication with another UE, depending on its state and on the configuration by the eNB. The inventors have identified numerous problems and disadvantages with the currently envisaged implementation of direct communication, i.e., 3GPP D2D communication. The following different scenarios and problems are present, and will be explained in connection with FIG. 18. FIG. 18 which is an extension of FIG. 15, additionally illustrates the UE indicating interest in D2D communication and the UE's request for dedicated radio resources for a D2D communication transmission, as well as various different time Periods 0, 1, 2, A, B, C, and D. Although not illustrated in FIG. 18, the UE may have Mode 2 resources preconfigured when it is out of coverage of a cell for SA and D2D data reception/transmission, as discussed in the background section.

Figure 16:
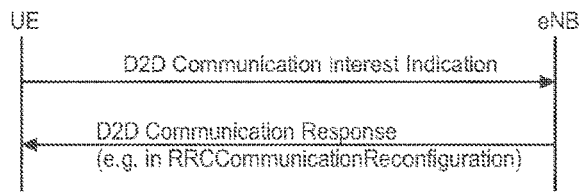
FIG. 16 illustrates the exchange of the D2D Communication Interest Indication message and the corresponding D2D Communication Response.

An eNB can decide that in its network no Mode 2 resource allocation is possible when the UE is in RRC idle. For purposes of explanation such type of networks are denoted Type A networks. In particular, in Type A networks, the UE sees in SIB18 that D2D is allowed, but since there are no common Mode 2 resources broadcast for the same (e.g., resource pool according to Mode 2), it must first establish an RRC connection (see FIG. 15). Then, after being properly configured for D2D (e.g., using the D2D Communication Interest Indication, and corresponding D2D Communication Response; see FIG. 16), it may have access to Mode 2 resources for transmission (depending on how the UE is configured by the eNB, corresponding to the D2D Communication Response message). In case the D2D Communication Response does not already provide usable resources for D2D communication, e.g., as a dedicated Mode 2 resource pool, the UE might even need to explicitly request D2D related resources using dedicated signaling (Scheduling Request, Buffer Status Report), as discussed before in the background section (see steps 1-5 in chapter Transmission procedure for D2D communication), which takes more time (see Period C).

Even more, Period D as illustrated in FIG. 18 is the delay in sending the first D2D after receiving a corresponding D2D grant. While this might be thought to be negligible, it may not be so, as calculations by the inventors have shown; Period D alone can be about 300-400 ms, depending on the resource configuration like periodicity of resource pool BITMAP for each SA and Data, their offset (say from SFN0), exact T-RPT (time resource pattern of transmission) allocated, etc.

Consequently, the UE cannot perform D2D communication in complete Period 2, illustrated in FIG. 18, or even for Periods C and D in case the D2D Communication Response from the eNB, although allowing D2D, does not provide Mode 2 resources dedicated to the UE (in which case the UE needs to specifically request grant of resources for the particular D2D transmission).

Figure 17:
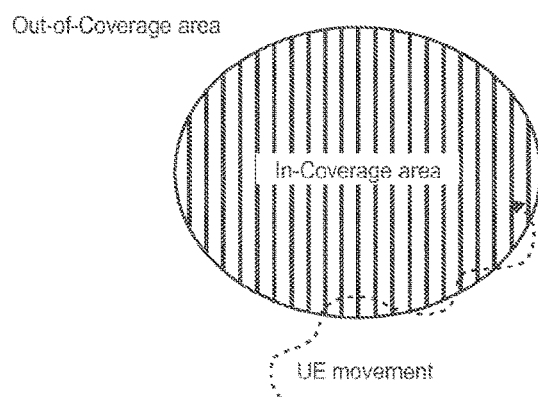
FIG. 17 illustrates the exemplary movement of a UE at the edge of a cell.

Type A networks allow the network operator full control over the use of resources since it would know how many UEs are performing D2D, and it may thus partition the resources between D2D and LTE usage. However, a UE in such a Type A network is unable to perform any D2D communication in idle state. Additionally, even after coming to RRC Connected state, the UE must send a D2D Communication Interest Indication message and at least wait for an explicit network response to receive D2D communication resources and further for the time until the actual transmission of communication data can occur (Period C and/or Period D). This delay may easily add up to 2 seconds or more. Since in Rel. 12 the D2D communication is mainly targeting public safety use cases, even a 2 seconds delay/ interruption is un-acceptable especially for VoIP/Voice/Conversational class of services. This is especially the case for cell-edge UEs, which may be treading in and out between the out-of-coverage and in-coverage situation; see FIG. 17 for an illustration of an UE which is moving at the edge of the cell.

This problem is narrowly mitigated in the other type of networks, where the network deployment by the eNB provides for common Mode 2 D2D communication resources to be used in RRC idle state; such a network can be denoted for explanatory purposes Type B network. In such Type B networks, the UE will start D2D communication using such Mode 2 idle resources after acquiring the SIB18 (containing the corresponding Mode 2 idle resource configuration, e.g., commIdleTxPool), and thus earlier than in Type A networks; thus, these UEs can perform D2D Data communication for a little while before facing again the interruption in Periods B, C, and D. Consequently, although D2D communication is not possible in Period 0, during Period A the UE can perform D2D communication.

Nevertheless, also in Type B networks, a UE is prevented at particular times from performing D2D communication, thus causing undesired delays and/or interruptions. The UE may continue to use the Mode 2 idle resources as long as it stays in RRC idle; the state of the art Mode 2 idle resources from SIB 18 can only be used in RRC idle. However, when the UE establishes an RRC connection (for whatever reasons; e.g., for WAN reasons, e.g., to access the Internet) and thus changes into the RRC connected state (see step 7 in FIG. 15), it may no longer use these resources of the Mode 2 resource pool defined by SIB18 to continue or initiate the D2D communication, i.e., as of step 7 of FIG. 15. In such a case, to resume a previously-started D2D communication or start a new D2D communication, the UE must at least send a D2D Communication Interest Indication message and wait for an explicit network response to receive Mode 2 D2D communication resources (or even wait longer when having to explicitly request grant of resources for the particular D2D transmission as discussed above in connection with steps 1-5 of the transmission procedure for D2D communication). This leads to a delay and/or interruption in the communication; UE cannot perform D2D communication in Periods B, C, (and D).

FIG. 20 shows the different Periods, introduced for FIG. 18, as blocks, and illustrates the difference between periods where D2D communication transmission is not possible for a UE, for Type A and Type B networks.

FIG. 19 is similar to FIG. 18, but illustrates a failed RRC connection establishment. As apparent therefrom, after initiating the RRC connection establishment, it fails (e.g., because RRC connection is rejected by the eNB; other reasons such as Cell Reselection, or T300 Expiry are possible too). The UE in any case stays in RRC idle state. In Type A networks such situations are particularly disadvantageous, since the UE will not be able at all to perform D2D communication while being in idle. For Type B networks on the other hand, D2D communication is possible after SIB 18 acquisition, which includes the Mode 2 idle resource configuration; i.e., during A and further.

One clean solution for Type B networks (which is also easy to implement) is to allow the Mode 2 idle resources (commIdleTxPool) to also be usable by terminals in the RRC connected state; at least until the terminals are assigned by the eNodeB with dedicated resources that are usable for direct communication transmissions (see Period B+C (+D) of FIG. 18).

The following first and second exemplary embodiments are conceived by the inventors to mitigate the problems explained.

In the following, several exemplary embodiments will be explained in detail. Some of these are supposed to be implemented in the wide specification as given by the 3GPP standards and explained partly in the present background section, with the particular key features as explained in the following pertaining to the various embodiments. It should be noted that the embodiments may be advantageously used for example in a mobile communication system such as 3GPP LTE-A (Release 10/11/12) communication systems as described in the Technical Background section above, but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the disclosure as such.

First Embodiment

In the following a first set of embodiments will be explained. To simplify the illustration of the principles of the first embodiment, several assumptions are made; however, it should be noted that these assumptions should not be interpreted as limiting the scope of the present application, as broadly defined by the claims.

According to the first aspect, an additional transmission radio resource pool is defined by the network operator for performing a direct communication transmission, this additional resource pool being different in several ways from the idle transmission radio resource pool already known from the prior art. As explained in the background section, if the network operator decides so, information on a transmission radio resource pool may be broadcast by the base station in its cell, such that terminals receiving said system information broadcast can autonomously use resources from said transmission radio resource pool in case they want to perform direct communication with another terminal. The transmission radio resource pool from the prior art (termed for ease of reference idle transmission radio resource pool) is usable by the terminal while it is in an idle state, but not when changing its state to connected, causing some of the problems mentioned above.

On the other hand, the additional transmission radio resource pool, introduced according to this first aspect (and termed for ease of reference temporary transmission radio resource pool), shall be used only temporarily (i.e., for a limited amount of time) but independently from whether the terminal is in an idle state or connected state. The network operator is able to control the amount of time during which this temporary transmission radio resource pool is usable by a corresponding additional indication (configuration information) in the system information broadcast. Limiting the usability of said temporary transmission radio resource pool in time can be implemented in several different ways, some of which will be exemplarily explained further down below, but are consistent in that the time during which said temporary resources can be used is limited and can be controlled by the base station (i.e., network operator).

Network operators might be hesitant to make the idle transmission radio resource pool commonly available for terminals via the system information broadcast, and rather prefer to assign particular dedicated resource pools to particular terminals or even only particular dedicated physical resources to each terminal, so as to maintain full control over its radio resources (or at least as much control as possible). Consequently, the network operator might not want terminals in its cell to autonomously use the prior art idle transmission radio resource pool, for example because the terminal could use resources from this idle transmission radio resource pool almost indefinitely (as long as the terminal stays in idle state) or because then the network does not know how many UEs are actually using these Idle mode D2D resources since it has no idea about the number of such UEs (Idle Mode UEs are not known at the cell level but only at the Tracking Area level which is much larger than a cell level); this does not allow the network to conclude if said Idle mode D2D resources are too less (meaning lot of collision in D2D resource usage) or too much (meaning un-necessarily eating away the otherwise LTE resources). The additional temporary transmission radio resource pool on the other hand allows the network operator to precisely define physical resources that are usable for a (more or less) configurable amount of time. This has of course the immediate benefit that terminals may get access to resources for a direct communication transmission, as soon as the terminals receive and process the corresponding system information broadcast with the information on the temporary transmission radio resource pool, while the network operator can flexibly control the time such resources are commonly made available to terminals in its cell. Since the amount/number of UEs establishing RRC Connection will be much limited to the total number of UEs in Idle mode in the cell, the additional temporary transmission radio resource pool can be much efficient/smaller in size compared with the prior art (Mode 2) Idle transmission radio resource pool broadcasted in SIB18. Further, additional temporary transmission radio resource pool is especially beneficial for terminals being in cells that indeed would not provide such an idle transmission radio resource pool. But it is also beneficial for terminals in the other type of cells that indeed broadcast the idle transmission radio resource pool, since in that case resources for direct communication transmission are also available when the terminal is already in connected state but not yet having been assigned dedicated resources by the base station for use in a direct communication transmission or not yet having made the actual transmission of D2D communication Data.

Overall, by providing the temporary transmission radio resource pool of the first aspect in the system information broadcast of a cell, instead or in addition to the prior art idle transmission radio resource pool, a delay or interruption of direct communication for the terminals is reduced or almost eliminated, while at the same time giving the network operator as much control as possible over such resources. Depending on the particular implementation, in cells of a Type A network (i.e., not including the idle transmission radio resource pool in the system information), terminals may use resources from the above discussed temporary transmission radio resource pool after receiving same, i.e., during Period A, Period B, Period C, and Period D as indicated in FIG. 18. In cells of Type B networks terminals may use resources from the temporary transmission radio resource pool during Periods B+C+D.

Further implementations of the first aspect relate to how the configuration information can limit the amount of time that the temporary transmission radio resource pool is usable by the transmitting terminals in the cell. For instance, the system information broadcast might directly indicate an appropriate amount of time, e.g., 10 ms, 100 ms, 2000 ms, for the temporary transmission radio resource pool. Then, depending on the particular implementation, this indicated amount of time would be interpreted by the terminal in that the temporary transmission radio resource pool is usable for this particular time after, e.g., the reception of the system information broadcast. Alternatively, instead of starting a timer when the terminal receives the system information broadcast, the timer could be started when the transmitting terminal starts using the temporary transmission radio resource pool (e.g., by transmitting a scheduling assignment in a direct communication transmission to another terminal). In any case, this has the particular benefit that such a configuration is independent from the radio connection establishment procedure and its outcome and is thus predictable by the base station.

As an alternative, or in addition, to directly indicating the amount of time, the time where the temporary transmission radio resource pool is usable can be limited "indirectly", by specifying particular conditions/events which stop the terminal from using said resources anymore. For instance, the system information broadcast could include an instruction in connection with the temporary transmission radio resource pool that a terminal wanting to use these resources must also try establishing a radio connection with the base station so as to avoid the terminal to stay in idle indefinitely using such resources. Then, the terminal is for instance only allowed to use resources from said temporary transmission radio resource pool until the connection is established and the base station assigns dedicated radio resources to the terminal, which shall then be used instead for a possible direct communication transmission (see Period A+B+C in FIG. 18); or if the connection cannot be established or is rejected, until the terminal is informed about this establishment failure (see Period A in FIG. 19); or the base station at that point, although establishing a connection with the terminal, may not permit the terminal to perform a direct communication transmission (see Period A+B in FIG. 18). Further still, in view of the long time it may take a terminal to actually use dedicated radio resource assigned by the base station to the terminal, a further alternative might extend the time that the temporary transmission radio resource pool is usable, until the point of time where the terminal (after establishing a radio connection with the base station and receiving from the base station dedicated radio resources for a direct communication transmission) actually performs a direct communication transmission of the SA or data using these dedicated radio resources assigned by the base station to the terminal (see Period A+B+C+D in FIG. 18).

The actual instruction to establish the connection could for instance indicate a particular amount of time within which the terminal needs to (at least) have started the connection establishment (starting, e.g., directly after receiving the system information broadcast or after starting to use the temporary transmission radio resource pool). Still another option is that the terminal is even required to initiate the connection establishment before being allowed to use radio resources from the temporary transmission radio resource pool for a direct communication transmission. For the present purpose, it may exemplarily be understood that the terminal starts the connection establishment with the base station by transmitting a preamble of a random access procedure.

In addition, for the first aspect, as is the case for the idle transmission radio resource pool of the prior art, the temporary transmission radio resource pool may differentiate between resources available for a direct communication transmission of a scheduling assignment and resources available for a direct communication transmission of direct data to another terminal over the direct link. Thus, the cell can provide different resources to be used for transmitting scheduling assignments and data.

Several different implementations of the first aspect have been described above. In the following, the principles behind the first aspect and its implementations are applied in an exemplary manner to an LTE system (such as the one described in the background section).

In particular, current 3GPP standardization envisages the use of SIB18 to contain some information related to the ProSe direct communication and discovery. Consequently, the information on the temporary transmission radio resource pool and its configuration information as described above can be made part of this SIBType 18. Of course, it should be noted that for the purposes of this first aspect, any other type of system information block can be used to carry this information. Furthermore, in the particular example chosen the field in the system information block to carry the temporary transmission radio resource pool and the configuration information is termed "commTxPoolTemp". Again, it should be noted that for the purposes of this aspect, any other name for the field can be chosen or the information on the temporary transmission radio resource pool can be inserted into a different field from the corresponding configuration information. The same applies to the names and formats chosen for the particular variables commSA-TxResourcePoolCommonTemp, commData-TxResourcePoolCommonTemp.

Correspondingly, the following definition of the system information block type 18 information element is to be taken as a mere example.

The important changes introduced into this exemplary system information block type 18 information element for the first aspect vis-à-vis the prior art are made bold and underlined for ease of identification. As apparent therefrom, in this particular example the configuration information is implemented as the variable "allowedTime", with exemplary time values of 100 ms, 200 ms, etc., as shown above, thus directly limiting the amount of time. Of course, the particular time values, and also the number of time values that are configurable, are to be understood as a mere example; any other time values and number of configurable time values may be chosen as appropriate. By reading the

---

SystemInformationBlockType18 information element

---

```
-- ASN1START
SystemInformationBlockType18-r12 ::= SEQUENCE{
    commConfig-r12                              SEQUENCE{
    -- FFS if the Rx resource pool can be provided by system information
        commSA-RxResourcePoolCommon-r12             ProseCommSA-ResourcePool-r12 OPTIONAL, -- Need OR
        commIdleTxPool-r12                          SEQUENCE{
            commSA-TxResourcePoolCommon-r12             ProseCommSA-ResourcePool-r12,
            -- FFS whether to signal data Tx resources (needed if not always be inferrable from
            -- the SA Tx resources
            commData-TxResourcePoolCommon-r12           ProseCommDataResourcePool-r12 OPTIONAL -- Need OR
        }                                           OPTIONAL                                -- Need OR
        commTxPoolTemp-r12                          SEQUENCE{
            commSA-TxResourcePoolCommonTemp-r12             ProseCommSA-ResourcePool-r12,
            commData-TxResourcePoolCommonTemp-r12           ProseCommDataResourcePool-r12
                                                            OPTIONAL -- Need
OR
            allowedTime                             ENUMERATED{
                                                    ms100, ms200, ms300, ms400, ms600, ms1000, ms1500,
                                                    ms2000}.
        }                                           OPTIONAL                                -- Need OR
    },                                              OPTIONAL,                               -- Need OR
    discConfig-r12                              SEQUENCE{
        discRxResourcePool-r12                      ProseDiscResourcePool-r12,
        discIdleTxPool-r12                          ProseDiscResourcePool-r12               OPTIONAL -- Need OR
    }                                           OPTIONAL,                                   -- Need OR
    discInterFreqList-r12                       CarrierFreqList-r12                         OPTIONAL, -- Need OR
    lateNonCriticalExtension                    OCTET STRING                                OPTIONAL,
    ...
}
CarrierFreqList-r12 ::= SEQUENCE (SIZE (1..maxFreq)) OF ARFCN-ValueEUTRA-r9
-- ASN1STOP
```

---

SystemInformationBlockType18 field descriptions

--- commIdleTxPool
Indicates the resources by which the UE is allowed to perform direct communication transmissions while in RRC_IDLE.
discInterFreqList
Indicates the neighbouring frequencies on which direct discovery announcement is supported.
discIdleTxPool
Indicates the resources by which the UE is allowed to transmit direct discovery announcements while in RRC_IDLE.
commTxPoolTemp
Indicates the resources by which the UE is allowed to perform direct communication transmissions while in RRC IDLE but it may only use these resources until allowedTime.

--- value indicated by the "allowedTime" variable, the terminal can determine for how long the temporary transmission radio resource pool is usable after the reception of the system information broadcast (or after the terminal starts using resources from the temporary transmission radio resource pool for performing a direct communication); a corresponding timer can be set up, and started and monitored by the UE.

As a further alternative, another example is given below for the definition of SIB18. As with the above exemplary definition, any names given to variables, and also particular values given to the variables can be seen as mere examples.

---

SystemInformationBlockType18 information element

---

```
-- ASN1START
SystemInformationBlockType18-r12 ::= SEQUENCE{
    commConfig-r12                              SEQUENCE{
    -- FFS if the Rx resource pool can be provided by system information
        commSA-RxResourcePoolCommon-r12             ProseCommSA-ResourcePool-r12 OPTIONAL, -- Need OR
        commIdleTxPool-r12                          SEQUENCE{
            commSA-TxResourcePoolCommon-r12             ProseCommSA-ResourcePool-r12,
```

SystemInformationBlockType18 information element

```
        -- FFS whether to signal data Tx resources (needed if not always be inferrable from
        -- the SA Tx resources
           commData-TxResourcePoolCommon-r12              ProseCommDataResourcePool-r12 OPTIONAL -- Need OR
        }                                                 OPTIONAL            -- Need OR
        commTxPoolTemp-r12                                SEQUENCE{
           commSA-TxResourcePoolCommonTemp-r12               ProseCommSA-ResourcePool-r12,
           commData-TxResourcePoolCommonTemp-r12             ProseCommDataResourcePool-r12 OPTIONAL -- Need
OR
           timeToInitiateRRCConnEst                          ENUMERATED{
                                                      ms01, ms05, ms10, alreadyInitiated},
        }                                                    OPTIONAL           -- Need OR
    },                                                       OPTIONAL,          -- Need OR
    discConfig-r12                                     SEQUENCE{
       discRxResourcePool-r12                             ProseDiscResourcePool-r12,
       discIdleTxPool-r12                                 ProseDiscResourcePool-r12     OPTIONAL -- Need OR
    }                                                     OPTIONAL,             -- Need OR
    discInterFreqList-r12                              CarrierFreqList-r12       OPTIONAL, -- Need OR
    lateNonCriticalExtension                           OCTET STRING             OPTIONAL,
        ...
}
CarrierFreqList-r12 ::= SEQUENCE (SIZE (1..maxFreq)) OF ARFCN-ValueEUTRA-r9
-- ASN1STOP
```

SystemInformationBlockType18 field descriptions commIdleTxPool
Indicates the resources by which the UE is allowed to perform direct communication transmissions while in RRC_IDLE.
discInterFreqList
Indicates the neighbouring frequencies on which direct discovery announcement is supported.
discIdleTxPool
Indicates the resources by which the UE is allowed to transmit direct discovery announcements while in RRC_IDLE.
commTxPoolTemp
Indicates the resources by which the UE is allowed to perform direct communication transmissions while in RRC IDLE but it must also subsequently or even already start initiating the RRC Connection Establishment Procedure i.e. initiate the PRACH access.
timeToInitiateRRCConnEst
Time within which the UE must start the RRC Connection Establishment Procedure i.e. initiate the PRACH access. ms01 indicates 1 ms, ms05 indicates 5 ms and so on. The value 'alreadyInitiated' indicates that the UE can only use the commTxPoolTemp after having initiated the RRC Connection Establishment Procedure e.g. upon having initiated the PRACH access.

The important changes introduced into this exemplary system information block type 18 information element for the first aspect vis-à-vis the prior art are made bold and underlined for ease of identification. As apparent from the above, the configuration variable timeToInitiateRRCConnEst is included so as to indirectly limit the usage of the temporary transmission radio resource pool (i.e. commTxPoolTemp) based on the different exit conditions as will be explained. By use of this configuration variable timeToInitiateRRCConnEst, the UE is instructed to try establishing an RRC connection with the eNB, within an exemplary time of 1, or 5 ms, etc., as shown above. Depending on different UE behavior, the UE could for example be then allowed to use the resources of the temporary transmission radio resource pool until the RRC connection is established and the eNB assigns dedicated radio resources to the terminal; or until the UE realizes that the RRC connection establishment fails; or until the UE is informed by the eNB that it is not permitted to perform direct communication in the cell; or until actually performing a direct communication of the SA or data using the dedicated resources assigned by the eNB to the UE.

It should also be noted that this new field, commTxPoolTemp, is made optional in SIB18, thus giving control to the network operator to decide whether to broadcast same in the cell or not. As a result, since the field commIdleTxPool (already defined in the state-of-the-art) is also optional, the network operator (via the eNB) can configure none, one of, or both of the fields commIdleTxPool and commTxPoolTemp, as needed.

Of course, also a combination of the above-shown SIB 18 definitions is possible, allowing a configuration where the commTxPoolTemp field includes the variables "allowedTime" and "timeToInitiateRRCConnEst".

Second Embodiment

A second aspect of the disclosure also solves the above-mentioned underlying problem(s) of the prior art, however in a different manner. Instead of defining an additional transmission radio resource pool in the system information broadcast as done for the first aspect, this second aspect is based on the idea of using a preconfigured transmission radio resource pool for a possible direct communication transmission, not only when the terminal is out of coverage of a cell (as currently defined in the prior art), but also when the terminal is in the coverage of a cell. Preconfigured in this context shall be differentiated from those "configured" resources configured by the system information broadcast from the base station. In other words, preconfigured resources are for instance known to the terminals (and base stations) even without receiving any information from the radio access, i.e., being independent from the cells and the system information broadcast therein. As such, preconfigured radio resources are in the state of the art already used by the UEs that are out of coverage of a cell, i.e., have not received any system information broadcast from the base station of any cell.

For example, a preconfigured transmission radio resource pool can be defined by the network operator and hard-coded into a common sim/USIM card, which is insertable and usable by most common mobile phones. Alternatively, higher-layer signalling could be used to provide a terminal with appropriate information on such a preconfigured transmission radio resource pool; e.g., from the core network via the Internet protocol or non-access-stratum protocol.

By using radio resources from a preconfigured transmission radio resource pool also when being in coverage of a cell, the terminal can perform a direct communication transmission independent from whether it receives the system information broadcast, from whether the system information broadcast includes or not information on a resource pool, from whether a radio connection is established or not, from which state the terminal is in (idle or connected), etc. Thus, the terminal is not prevented, delayed or interrupted with regard to a direct communication transmission. Therefore, and in contrast to the first embodiment, according to the second aspect, terminals may also perform direct communication transmission in Period 0; in addition to Periods A, B, C, and D.

One option is to re-configure the preconfigured transmission radio resource pool already defined in the state-of-the-art for out-of-coverage terminals so as to also apply to terminals that are in coverage of a cell of the base station.

On the other hand, an alternative option would be to configure a new in-coverage preconfigured transmission radio resource pool in addition to that preconfigured transmission radio resource pool already defined in the state-of-the-art for out-of-coverage terminals, the in-coverage preconfigured transmission radio resource pool applying to terminals that are in coverage but not usable for those terminals still being out of coverage of the cell of the base station. In this case, both the out-of-coverage preconfigured transmission radio resource pool of the state-of-the-art as well as the in coverage preconfigured transmission radio resource pool according to the second aspect can be stored on the sim/USIM card or alternatively can be defined by higher layer signaling, as mentioned above.

In a further advancement of the second aspect, the network operator shall have some control on whether this preconfigured transmission radio resource pool (even though same is preconfigured for a particular terminal) is actually usable in its cell. For instance, the network operator could decide that in its cell those resources of the preconfigured transmission radio resource pool shall not be available to the terminals. To said end, the system information broadcast shall properly indicate whether the terminals that are in coverage of the cell are allowed or not to use it.

One simple possibility for this indication is a one-bit flag in the system information, one bit value indicating allowance, and the other bit value indicating that use of the preconfigured transmission radio resource pool is not allowed for terminals in the coverage of the cell.

Alternatively, the system information may optionally include configuration information for the preconfigured transmission radio resource pool, such that in the absence of the configuration information the terminal understands that the preconfigured transmission radio resource pool shall not be used. On the other hand, when the configuration information on the preconfigured transmission radio resource pool is present in the system information and thus received by a terminal attaching to the cell, the terminal understands that it can continue using the preconfigured transmission radio resource pool for direct communication transmissions, but in addition applies said configuration information on the usage of same.

The configuration information can vary. For instance, according to improvements for the second aspect, it is beneficial to also restrict usage of said preconfigured transmission radio resource pool in time while being in coverage of the cell. As discussed with the first aspect there are several possibilities on how to limit the amount of time a particular radio resource pool is usable for a terminal. The configuration information for the preconfigured transmission radio resource pool can thus be similar, or identical to the one discussed above for the temporary transmission radio resource pool.

In detail, the system information broadcast might for example directly indicate an appropriate amount of time, e.g., 10 ms, 100 ms, 2000 ms, for the preconfigured transmission radio resource pool. Then, depending on the particular implementation, this indicated amount of time would be interpreted by the terminal in that the preconfigured transmission radio resource pool is usable for this particular time after, e.g., the reception of the system information broadcast. Alternatively, instead of starting a timer when the terminal receives the system information broadcast, the timer could be started when the transmitting terminal starts using the preconfigured transmission radio resource pool (e.g., by transmitting a scheduling assignment in a direct communication transmission to another terminal).

As an alternative, or in addition, to directly indicating the amount of time, the time where the preconfigured transmission radio resource pool is usable can be limited "indirectly", by specifying particular conditions/events which stop the terminal from using said resources anymore. For instance, the system information broadcast could include an instruction associated with the preconfigured transmission radio resource pool that a terminal wanting to use these resources must also try establishing a radio connection with the base station so as to avoid the terminal to stay in idle indefinitely using such resources. Then, the terminal is for instance only allowed to use resources from said preconfigured transmission radio resource pool until the connection is established and the base station assigns dedicated radio resources to the terminal, which shall then be used instead for a possible direct communication transmission (see Period 0+A+B+C in FIG. 18); or if the connection cannot be established or is rejected, until the terminal is informed about this establishment failure (see Period 0+A in FIG. 19); or the base station at that point, although establishing a connection with the terminal, may not permit the terminal to perform a direct communication transmission (see Period 0+A+B in FIG. 18). Further still, in view of the long time it may take a terminal to actually use dedicated radio resource assigned by the base station to the terminal, a further alternative might extend the time that the preconfigured transmission radio resource pool is usable, until the point of time where the terminal (after establishing a radio connection with the base station and receiving from the base station dedicated radio resources for a direct communication transmission) actually performs a direct communication transmission of the SA or data using these dedicated radio resources assigned by the base station to the terminal (see Period 0+A+B+C+D in FIG. 18).

The actual instruction to establish the connection could for instance indicate a particular amount of time within which the terminal needs to (at least) have started the connection establishment (starting, e.g., directly after receiving the system information broadcast or after starting to use the preconfigured transmission radio resource pool). Still another option is that the terminal is even required to initiate the connection establishment before being allowed to use radio resources from the preconfigured transmission radio resource pool for a direct communication transmission. For the present purpose, it may exemplarily be understood that the terminal starts the connection establishment with the base station by transmitting a preamble of a random access procedure.

The preconfigured transmission radio resource pool can define the actual physical radio resources (i.e., time and frequency), and may optionally also define a particular transmission format or power associated with the physical radio resources. Also, when the terminal is in-coverage and uses the preconfigured transmission radio resource pool for a direct communication transmission power for those transmissions may be controlled by the base station (in a usual manner).

Several different implementations of the second aspect have been described above. In the following, the principles behind the second aspect and its implementations are applied in an exemplary manner to an LTE system (such as the one described in the background section).

According to some implementations discussed above for the second aspect, the system information broadcast from the base station is adapted so as to allow/disallow usage of the preconfigured transmission radio resource pool when being in coverage and/or to configure its usage.

As mentioned for the first aspect, current 3GPP standardization envisages the use of SIB18 to contain some information related to the ProSe direct communication and discovery, and could carry the flag or configuration information, mentioned above. Of course, it should be noted that for the purposes of this second aspect, any other type of system information block can be used to carry this information. In the following a very specific example is given where the configuration and configuration variables are given particular names (i.e., usePreconfigResInCoverage, allowedTime, timeToInitiateRRCConnEst), and the variables are set up specifically (i.e., ms100, ms200, ms300, etc., ms01, ms05, etc.). Again, it should be noted that for the purposes of this second aspect, any other name for the fields can be chosen, and also the actual values for the variables can be different.

SystemInformationBlockType18 information element

```
-- ASN1START
SystemInformationBlockType18-r12 ::= SEQUENCE{
    commConfig-r12                        SEQUENCE{
    -- FFS if the Rx resource pool can be provided by system information
        commSA-RxResourcePoolCommon-r12                    ProseCommSA-ResourcePool-r12 OPTIONAL, -- Need OR
        commIdleTxPool-r12                SEQUENCE {
            commSA-TxResourcePoolCommon-r12                    ProseCommSA-ResourcePool-r12,
            -- FFS whether to signal data Tx resources (needed if not always be inferrable from
            -- the SA Tx resources
            commData-TxResourcePoolCommon-r12                    ProseCommDataResourcePool-r12 OPTIONAL -- Need OR
        }                                                OPTIONAL    -- Need OR
        usePreconfigResInCoverage-r12                    SEQUENCE{
            allowedTime                            ENUMERATED{
                                ms100, ms200, ms300, ms400, ms600, ms1000, ms1500,
                                ms2000},                                OPTIONAL
            timeToInitiateRRCConnEst                    ENUMERATED{
                                ms01, ms05, ms10, alreadyInitiated} OPTIONAL
        }                                                OPTIONAL    -- Need OR
    },                                                   OPTIONAL,   -- Need OR
    discConfig-r12                        SEQUENCE{
        discRxResourcePool-r12                        ProseDiscResourcePool-r12,
        discIdleTxPool-r12                ProseDiscResourcePool-r12                    OPTIONAL -- Need OR
    }                                                OPTIONAL,    -- Need OR
    discInterFreqList-r12                CarrierFreqList-r12            OPTIONAL, -- Need OR
    lateNonCriticalExtension                OCTET STRING                    OPTIONAL,
    ...
}
CarrierFreqList-r12 ::= SEQUENCE (SIZE (1..maxFreq)) OF ARFCN-ValueEUTRA-r9
-- ASN1STOP
```

SystemInformationBlockType18 field descriptions commIdleTxPool
Indicates the resources by which the UE is allowed to perform direct communication transmissions while in RRC_IDLE.
discInterFreqList

| SystemInformationBlockType18 field descriptions |
| --- |
| Indicates the neighbouring frequencies on which direct discovery announcement is supported.<br>discIdleTxPool<br>Indicates the resources by which the UE is allowed to transmit direct discovery announcements while in RRC_IDLE.<br>usePreconfigResInCoverage<br>If included indicates that the UE is allowed to use the preconfigured resources in cell coverage.<br>allowedTime<br>the UE may use usePreconfigResInCoverage until allowedTime. The value ms100 indicates 100 ms, ms200 indicates 200 ms and so on.<br>timeToInitiateRRCConnEst<br>Time within which the UE must start the RRC Connection Establishment Procedure i.e. initiate the PRACH access. ms01 indicates 1 ms, ms05 indicates 5 ms and so on. The value 'alreadyInitiated' indicates that the UE can use the preconfigured-resources only after having initiated the RRC Connection Establishment Procedure i.e. upon having initiated the PRACH access |

The important changes introduced into this exemplary system information block type 18 information element for the second aspect vis-à-vis the prior art are made bold and underlined for ease of identification.

As apparent from the above, the configuration information field "usePreconfigResInCoverage" is optional, such that when this field is present in the system information broadcast the UE can derive that the corresponding preconfigured transmission radio resource pool (Mode 2 resources) are available when in coverage; conversely, in the absence of this field, the UE derives that the corresponding preconfigured transmission radio resource pool is not available in the cell.

The configuration variables "allowedTime" and "timeToInitiateRRCConnEst" are as such already known from the first aspect discussed above, and are defined for this second aspect in the same manner. As apparent from the above example, these can be even defined at the same time, if so decided by the eNB, thereby allowing to directly and/or indirectly limit the amount of time the in coverage preconfigured transmission radio resource pool is usable. Thus, in this particular example part of the configuration information is implemented as the variable "allowedTime", with exemplary time values of 100 ms, 200 ms, etc., as shown above, thus directly limiting the amount of time. By reading the value indicated by the "allowedTime" variable, the terminal can determine for how long the preconfigured transmission radio resource pool is usable after the reception of the system information broadcast (or after the terminal starts using resources from the temporary transmission radio resource pool for performing a direct communication); a corresponding timer can be set up, started and monitored by the UE.

Likewise, the configuration variable "timeToInitiateRRCConnEst" may be included so as to indirectly limit the usage of the temporary transmission radio resource pool (i.e., commTxPoolTemp) based on the different exit conditions as will be explained. By use of this configuration variable timeToInitiateRRCConnEst, the UE is instructed to try establishing an RRC connection with the eNB, within an exemplary time of 1, or 5 ms, etc., as shown above. Depending on the different UE behavior, the UE could for example be then allowed to use the resources of the preconfigured transmission radio resource pool until the RRC connection is established and the eNB assigns dedicated radio resources to the terminal; or until the UE realizes that the RRC connection establishment fails; or until the UE is informed by the eNB that it is not permitted to perform direct communication in the cell; or until actually performing a direct communication of the SA or data using the dedicated resources assigned by the eNB to the UE.

Furthermore, it should be noted that while this second embodiment was explained as a standalone solution contrasting to the first embodiment, still in general this second embodiment can be combined with the first embodiment.

Third Embodiment

In connection with D2D communication and the current development, the inventors have identified further problems. In more detail, apart from the above-described problem(s) regarding the different periods at which a UE is prevented from performing D2D communication in the different scenarios, another problem relates to state 3 and state 4 OOC UEs. In particular, it is yet unclear how a particular UE knows whether it is in state 3 (CP UE-relay) or in state 4. This leads to the further problem that it is not clear for a UE what resources and transmission power it should use to perform D2D communication.

Figure 11:
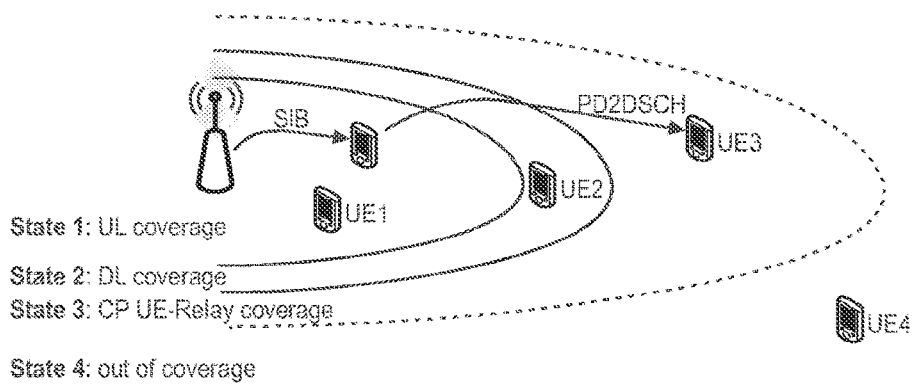
FIG. 11 illustrates that coverage regarding four different states the D2D UE can be associated to, FIG. 12 schematically illustrates a PC 5 interface for device-to-device direct discovery.
Figure 12:
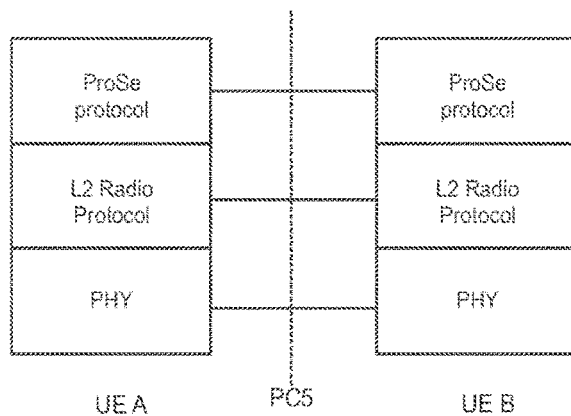
Figure 14:
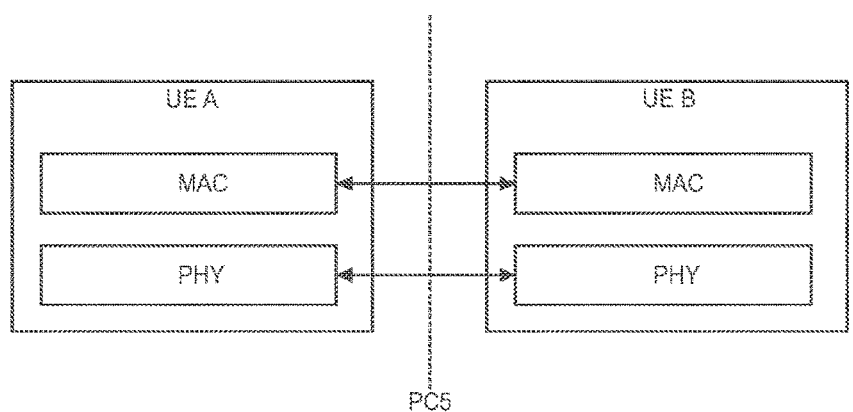
Figure 13:
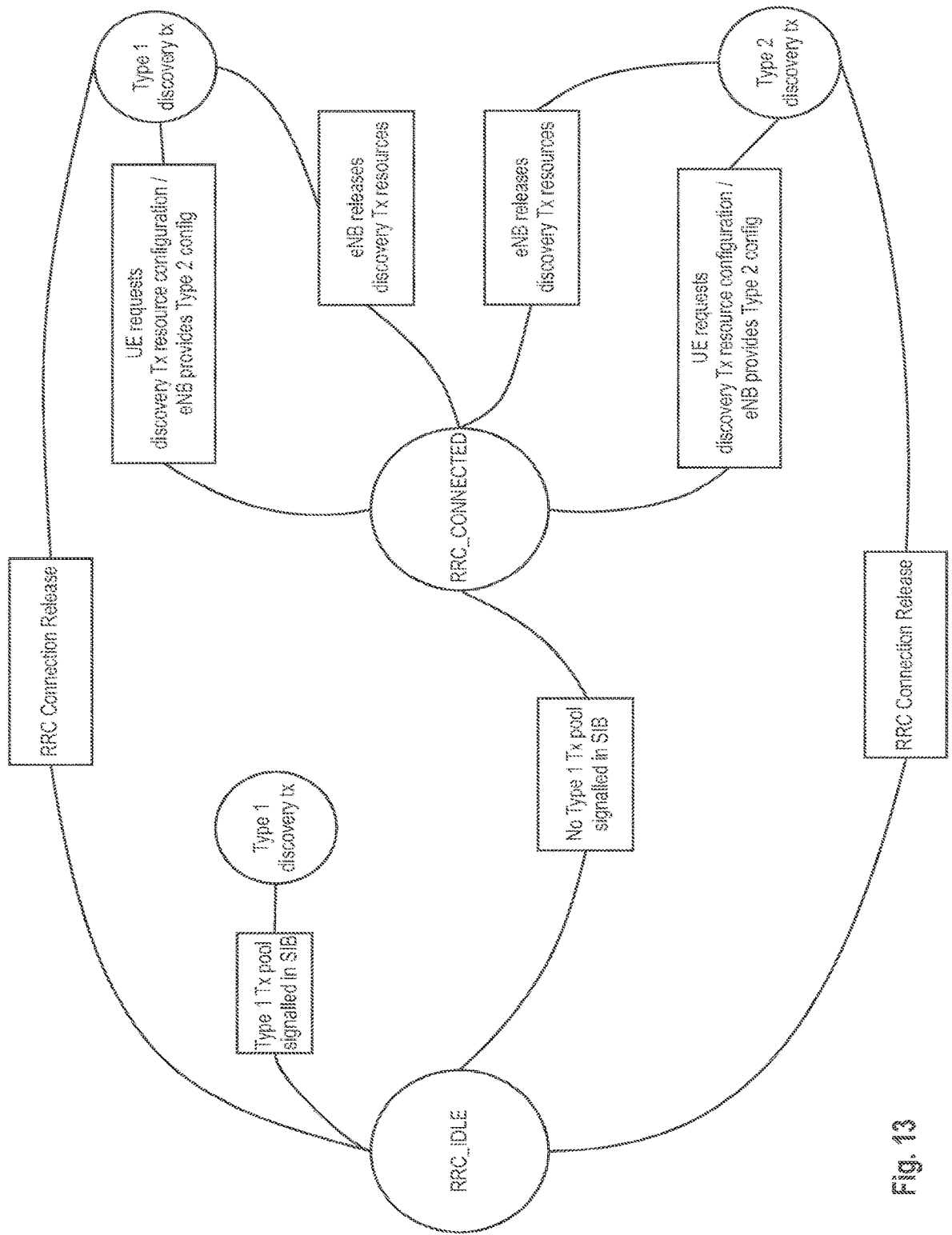
FIG. 13 illustrates a diagram showing the idle and connected mode in the reception of discovery resources in D2D communication, FIG. 14 schematically illustrates a radio protocol stack for ProSe direct discovery.

FIG. 11 and the corresponding description of the background section explain the 4 general states that a UE can be in which is summarized in the following:

State 1: In Cell Coverage (IC)—very close to the cell center

State 2: In Cell Coverage (IC)—at the cell edge

State 3: Out of Cell Coverage—just outside the cell; these UEs can create some WAN interference "if" transmitting on conflicting resources with high transmit power State 4: "Real" Out of Cell Coverage—cannot create any kind of WAN interference even if transmitting on conflicting resources with high transmit power As apparent, in both states 3 and 4 the UE is out of coverage of the cell, but it is unclear how the UE can differentiate between states 3 and state 4, since it only knows that it is not in cell coverage, i.e., not camped on any WAN cell.

The following solution(s) is(are) possible.

If a UE receives PD2DSCH, it considers itself to be in State 3; otherwise, if a UE did not receive PD2DSCH for a certain predefined (or configurable) time, it considers itself in State 4. As explained in the background section, PD2DSCH is a physical layer information sent by the eNB to OOC (Out-of-Coverage) UEs via some IC UEs (IC UEs forward the PD2DSCH). PD2DSCH signals some resources for D2D communication. If received by OOC UEs, the resources received in the PD2DSCH for D2D communication take priority over any preconfigured Mode 2 resources available to OOC UEs. This is advantageous, since otherwise the use of the preconfigured Mode 2 resources could create some WAN interference, because these UEs would consider themselves to be in State 4 otherwise and might be transmitting on conflicting resources with high transmit power.

A State 3 UE would consider itself to be a State 4 UE again, when it stops receiving PD2DSCH or D2DSS (D2D Synchronization Signal) for a predefined time period.

By specifying how the UE distinguishes between State 3 and State 4, the resources and transmission power it should use to perform D2D communication is selectable/calculatable in an efficient manner so as to not cause any problems (interference) with WAN communication.

It should be noted, that the third embodiment as explained above can be combined with the first and/or the second embodiment explained above.

Fourth Embodiment

Another problem identified for D2D communication is that it is unclear from the current standardization which UE is supposed to forward the PD2DSCH to OOC UEs.

The following alternative solutions are possible. Also combinations of the following are possible.

Generally, UEs that are well enough in cell coverage (e.g., good RSRP and RSRQ measurement values of the serving cell), but are not close to the cell center, can be a good option for forwarding the PD2DSCH. Specifically, UEs that lie between a certain radio reception predefined threshold (e.g., for which the RSRP/RSRQ measurements lie between a particular threshold "x" and threshold "y"); RSRP (Reference Signal Received Power); RSRQ (Reference Signal Received Quality). In such a case, the threshold x and threshold y are broadcast together with the content of the PD2DSCH.

Another possible candidate to forward the PD2DSCH are UEs that transmit/forward the D2DSS. The content of PD2DSCH is broadcast.

Another possible solution is that the network explicitly requests particular UEs in dedicated signaling to forward the PD2DSCH. The content of PD2DSCH is broadcast or signaled to the UEs with dedicated signaling.

One possible combination of the above solutions is the UE that already forwards the D2DSS, but also has a good enough in cell coverage, i.e., where RSRP or RSRQ lie between corresponding thresholds.

It should be noted that the fourth embodiment can be used together with either one of, or any combination of, the first, the second, and the third embodiments.

Fifth Embodiment

Yet another problem identified for D2D communication is related to the receiving/transmission operation for D2D communication. As mentioned in the technical background section, depending on the resource allocation mode the D2D communication transmission operation looks a bit different. For Mode 1 D2D communication the eNB issues a D2D grant, i.e., (E-PDCCH) scrambled with D2D-RNTI, to the D2D transmitting UE, which allocates resources for the SA transmission and also for the Data (ProSe/D2D data). More in particular, the D2D grant contains at least an index to the SA resources (SA resource index), pointing to the time/frequency resources to be used by the D2D transmitting UE for transmission of SA within the SA resource pool, and a T-RPT index and Data RB allocation field which are basically indicating the time/frequency resources for the D2D data transmissions. The T-RPT index field refers to one entry in a table which lists all available T-RPT patterns, e.g., the table contains 128 entries. A time resource pattern of transmission (T-RPT pattern) defines the time resource pattern of D2D data transmissions within the D2D data resource pool.

When receiving a D2D grant from the eNB, the D2D transmitting UE uses the SA resource index in order to determine the subframes and the frequency resources within the SA resource pool to be used for the transmission respectively retransmission of the SA message. Further, the D2D transmitting UE uses at least the T-RPT index information received within the D2D grant in order to determine the subframes (and potentially also the frequency resources based on some other information conveyed in the D2D grant) to be used for the transmission of the D2D data PDUs. The function how to derive the subframes for the transmissions of the D2D data PDUs differs for Mode 1 and Mode 2 D2D transmissions. For Mode 2 D2D transmissions, the D2D transmitting UE will apply the T-RPT pattern to the subframes which are denoted as ones in the resource pool bitmap. Essentially, the D2D transmitting UE applies the T-RPT pattern to those subframes which are defined as potential D2D subframes for Mode 2 transmission according to the D2D Mode 2 data transmission resource pool. An example is shown in the FIG. 22

Figures 21, 22:
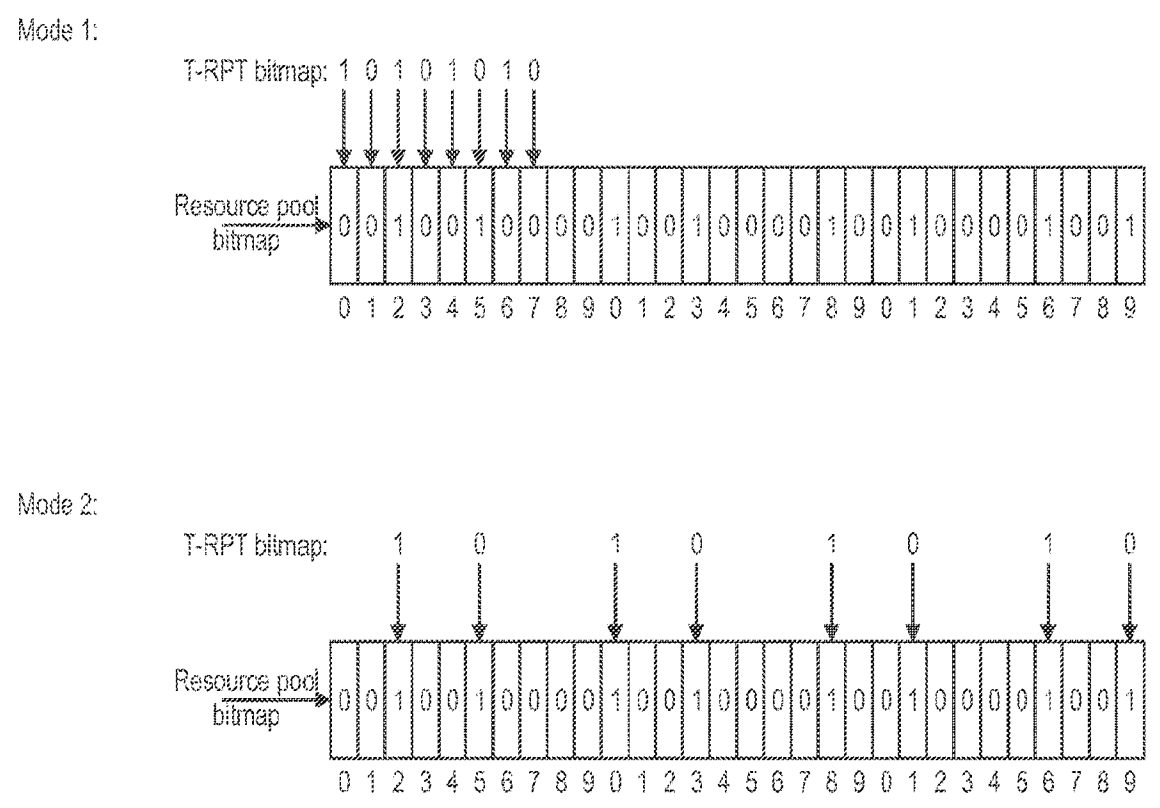

The 1s in the transmission resource pool bitmap denote the so-called D2D subframes, i.e., subframes reserved for D2D Mode 2 transmission. The T-RPT pattern is applied to those D2D subframes. As can be seen in FIG. 22, those D2D subframes where the corresponding T-RPT entry is 1 shall be used for D2D data PDU transmissions (subframes where resource pool bitmap entry and T-RPT bitmap entry are both 1). As already mentioned in the technical background, for Mode 2 resource allocation the D2D transmitting UE selects autonomously the T-RPT pattern and signals this in the SA, so that D2D receiving UEs are able to determine (after having decoded the SA correctly) based on the received T-RPT pattern the time/frequency resource of the D2D data transmissions. There is no D2D grant for Mode 2 D2D transmission.

For Mode 1 D2D transmissions the eNB allocates the T-RPT pattern to be used for D2D transmission and signals this to D2D transmitting UE by means of the D2D grant as already explained above.

Considering the absence of a D2D transmission resource pool for Mode 1, parameters in T-RPT would directly apply to the physical uplink subframes since all uplink subframes can be D2D subframes. According to one exemplary embodiment, the D2D transmitting UE would apply the T-RPT pattern indicated by the T-RPT pattern index in the D2D grant to all subframes in the resource pool bitmap, i.e., the subframes where the bitmap entry is 1 as well as 0. An example for the Mode 1 D2D data transmission is shown in the FIG. 21.

As can be seen, the same T-RPT pattern as used in the exemplary scenario illustrating Mode 2 D2D transmission is also taken here; however, for Mode 1 it is applied to all (UL) subframes in the resource pool. Since there is no data transmission resource pool defined/configured for Mode 1, the D2D transmitting UE could apply the T-RPT pattern either to the Mode 2 data transmission pool or alternatively to a data receiving resource pool. The crucial point is that there needs to be some reference respectively starting subframe where the T-RPT pattern is applied to for Mode 1. As an alternative there could be some timing relation between first transmission of D2D data and SA predefined. For example the first D2D mode 1 data transmission opportunity, i.e., this is the starting subframe of the T-RPT pattern, occurs x ms after the last transmission of the SA message.

The T-RPT pattern is used differently depending on whether Mode 1 or Mode 2 D2D data transmission is used by the D2D transmitting UE. Therefore, the D2D receiving UE should be able to distinguish between Mode 1 and Mode 2 D2D transmissions. More in particular, when receiving an SA in the SA resource pool, the D2D receiving UE needs to be aware of whether the SA was transmitted by a Mode 1 or Mode 2 D2D transmission in order to be able to interpret the T-RPT pattern correctly, i.e., in order to determine the correct time/frequency resources of the corresponding D2D data transmissions. According to another exemplary embodiment, the SA message contains an explicit indicator of the used resource allocation mode for D2D communication, i.e., a new field in the SA message indicates whether Mode 1 or Mode 2 was used for D2D data transmission.

As an alternative solution, the transmission/resource allocation mode is indicated implicitly by the T-RPT pattern signaled within the SA message. The available T-RPT patterns which are either preconfigured or given in a table are split into two sets, one set of T-RPT patterns is used for Mode 1 transmission, and the second set of T-RPT patterns is used for Mode 2. For example assuming 128 different T-RPT patterns, the patterns 0-63 could be used for Mode 1 D2D transmissions, whereas T-RPT patterns with an index 64-127 are reserved for Mode 2. Based on the received T-RPT index in the SA, the D2D receiving UE could understand whether transmission UE is using resource allocation mode 1 or mode 2.

As a further alternative solution according to still another exemplary embodiment, the transmission/resource allocation could be derived from the value of the TA field contained in the SA. Since Mode 1 transmissions and Mode 2 transmissions use different transmission timings, the receiving UE could distinguish between Mode 1 and Mode 2 transmissions based on the value of theta field. For example, the TA value for Mode 2 transmission is always zero, whereas for Mode 1 the TA value is set to the NTA value of the UE, i.e., UE uses legacy uplink transmission timing for Mode 1 D2D transmissions.

As a further alternative, the resource allocation/transmission mode could be indicated implicitly by the frequency resources used for the transmission of the SA message. For example, SA messages sent by Mode 2 transmitting UEs are different to the frequency resources used for SA transmissions of Mode 1 transmitting UEs. More in particular, the SA transmission resource pool for Mode 2 is different to the resources assigned by eNB for SA transmissions (Mode 1).

Yet another alternative solution according to a further exemplary embodiment of the disclosure is to define the T-RPT pattern bitmap length in such a way, that there is no ambiguity between Mode 1 and Mode 2 transmissions. More in particular, the T-RPT pattern bitmap length should be the same as the resource pool bitmap length the T-RPT pattern is applied to. Taken the examples shown in the FIG. 21 and FIG. 22 discussed above, the T-RPT pattern length should be 30 bits.

Since the T-RPT pattern for both Mode 1 and Mode 2 is applied to the same starting subframe, e.g., starting subframe of the resource pool, the D2D receiving UE does not need to distinguish between Mode 2 and Mode 1 transmissions.

It should be noted that the firth embodiment can be used together with either one of, or any combination of, the first, the second, the third, and the fourth embodiments.

Hardware and Software Implementation of the Present Disclosure

Other exemplary embodiments relate to the implementation of the above described various embodiments using hardware and software. In this connection a user equipment (mobile terminal) and an eNodeB (base station) are provided. The user equipment and base station is adapted to perform the methods described herein.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A base station comprising:
circuitry, which, in operation, generates a system information broadcast message, wherein
the system information broadcast message includes information on an idle transmission radio resource pool, wherein the information indicates radio resources usable by transmitting terminals in an idle state for performing a direct communication transmission to a receiving terminal over a direct link connection using the idle transmission radio resource pool; or the system information broadcast message does not include the information on the idle transmission radio resource pool, and includes information on a temporary transmission radio resource pool, wherein the information on the temporary transmission radio resource pool indicates radio resources usable by transmitting terminals in an idle state or in a connected state for performing a direct communication transmission to a receiving terminal over a direct link connection using the temporary transmission radio resource pool; and a transmitter, which, in operation, transmits, to the transmitting terminals, the system information broadcast message.

2. The base station according to claim 1, wherein the temporary transmission radio resource pool is usable by the transmitting terminal only until one of the following:

the transmitting terminal is assigned, by the base station, with dedicated radio resources usable for performing a direct communication transmission, the transmitting terminal performs a direct communication transmission for the first time using dedicated radio resources assigned by the base station to the transmitting terminal, a radio connection establishment procedure initiated by the transmitting terminal fails, or the transmitting terminal is informed by the base station that the transmitting terminal is not permitted to perform a direct communication in a cell of the base station;

wherein the dedicated radio resources are radio resources selectable from an assigned transmitting radio resource pool, assigned to the transmitting terminal by the base station, or the dedicated radio resources are radio resources assigned to the transmitting terminal by the base station in response to a resource request from the transmitting terminal for a direct communication transmission.

3. The base station according to claim 2, wherein the dedicated radio resources start at a subframe after a subframe in which the transmitting terminal transmits a Scheduling Assignment (SA) message.

4. The base station according to claim 1, wherein the temporary transmission radio resource pool indicates a first set of radio resources usable for performing a direct communication transmission of a scheduling assignment to a receiving terminal over a direct link connection, the scheduling assignment indicating the radio resources to be used by the transmitting terminal for performing a subsequent direct communication transmission of data to the receiving terminal over the direct link connection, or wherein the temporary transmission radio resource pool indicates a second set of radio resources usable for performing a direct communication transmission of data to a receiving terminal over a direct link connection.

5. The base station according to claim 1, wherein the system information broadcast message is System Information Block (SIB) Type 18.

6. The base station according to claim 1, wherein the temporary transmission radio resource pool is usable by the transmitting terminal when a timer (T300) for Radio Resource Control (RRC) connection establishment expires.

7. The base station according to claim 1, wherein the system information broadcast message indicates whether the temporary transmission radio resource pool is usable when the transmitting terminal is in coverage of a cell of the base station.

8. A method of a base station, the method comprising:

generating a system information broadcast message, wherein the system information broadcast message includes information on an idle transmission radio resource pool, wherein the information indicates radio resources usable by transmitting terminals in an idle state for performing a direct communication transmission to a receiving terminal over a direct link connection using the idle transmission radio resource pool; or the system information broadcast message does not include the information on the idle transmission radio resource pool, and includes information on a temporary transmission radio resource pool, wherein the information on the temporary transmission radio resource pool indicates radio resources usable by transmitting terminals in an idle state or in a connected state for performing a direct communication transmission to a receiving terminal over a direct link connection using the temporary transmission radio resource pool; and transmitting, to the transmitting terminals, the system information broadcast message.

9. An integrated circuit for controlling a process of a base station, the process comprising:

generating a system information broadcast message, wherein the system information broadcast message includes information on an idle transmission radio resource pool, wherein the information indicates radio resources usable by transmitting terminals in an idle state for performing a direct communication transmission to a receiving terminal over a direct link connection using the idle transmission radio resource pool; or the system information broadcast message does not include the information on the idle transmission radio resource pool, and includes information on a temporary transmission radio resource pool, wherein the information on the temporary transmission radio resource pool indicates radio resources usable by transmitting terminals in an idle state or in a connected state for performing a direct communication transmission to a receiving terminal over a direct link connection using the temporary transmission radio resource pool; and transmitting, to the transmitting terminals, the system information broadcast message.

* * * * *